United States Patent [19]

Tanaka et al.

[11] Patent Number: 5,956,421
[45] Date of Patent: Sep. 21, 1999

[54] IMAGE PROCESSING METHOD AND APPARATUS FOR DETERMINING A BINARIZATION THRESHOLD VALUE USED FOR BINARIZING A MULTI-VALUED IMAGE AND PERFORMING BINARIZATION PROCESSING

[75] Inventors: Tetsuomi Tanaka, Kawasaki; Osamu Yamada, Yokohama, both of Japan

[73] Assignee: Canon Kabushiki Kaisha, Tokyo, Japan

[21] Appl. No.: 08/807,605

[22] Filed: Feb. 27, 1997

[30] Foreign Application Priority Data

Feb. 28, 1996 [JP] Japan .................................. 8-041752
May 17, 1996 [JP] Japan .................................. 8-123341

[51] Int. Cl.$^6$ .............................. G06K 9/38; G06T 5/40
[52] U.S. Cl. ..................... 382/172; 382/176; 382/237; 382/255; 382/272; 382/303; 358/429
[58] Field of Search .................................. 382/172, 176, 382/237, 271, 303, 304, 272, 274, 255, 168, 171; 358/429, 432, 433, 465

[56] References Cited

U.S. PATENT DOCUMENTS

| | | | |
|---|---|---|---|
| 4,524,455 | 6/1985 | Holsztynski et al. | 382/303 |
| 4,620,292 | 10/1986 | Hagiwara et al. | 364/748 |
| 4,636,845 | 1/1987 | Alkofer | 358/522 |
| 4,656,665 | 4/1987 | Pennebaker | 382/172 |
| 4,825,065 | 4/1989 | Imai | 250/205 |
| 4,905,294 | 2/1990 | Sugiura et al. | 382/180 |
| 5,134,578 | 7/1992 | Garverick et al. | 364/752 |
| 5,351,313 | 9/1994 | Bessho et al. | 382/172 |
| 5,485,529 | 1/1996 | Kurita et al. | 382/162 |
| 5,680,151 | 10/1997 | Grimm et al. | 345/419 |

OTHER PUBLICATIONS

Otsu, "An Automatic Threshold Selection Method Based on Discriminant & Least Squares Criteria", Journal of Papers of the Institute of Electronics, Information & Communication Engineers, vol. J63–D, No. 4, pp. 349–356, 1980.

Mano, M. Morris, "Computer Systems Architecture", 1993, pp. 60–61.

Primary Examiner—Kim Yen Vu
Assistant Examiner—David Rosenblum
Attorney, Agent, or Firm—Fitzpatrick, Cella, Harper & Scinto

[57] ABSTRACT

An image processor determines a binarization threshold value used for binarizing a multi-valued image, and performs binarization processing on the multi-valued image. The multi-valued image is input line-sequentially, the binarization threshold values are determined sequentially in units of predetermined size blocks each including a plurality of pixels, and the multi-valued image data is binarized line-sequentially. The inputting of data, determining the threshold value, and binarization of the multi-value image data is performed by pipeline processing.

23 Claims, 30 Drawing Sheets

FIG.3

|  | START | END | AV | SK |
|---|---|---|---|---|
| FIRST LOOP | 0 | 255 | 177 | -78.9 |
| SECOND LOOP | 0 | 177 | 91 | -8.6 |
| THIRD LOOP | 0 | 91 | 43 | 9.6 |
| FOURTH LOOP | 43 | 91 | 72 | -7.0 |
| FIFTH LOOP | 43 | 72 | 58 | -2.2 |
| SIXTH LOOP | 43 | 58 | 50 | -0.4 |

FIG.18

| | | |
|---|---|---|
| P801 | START=0 END=255 | |
| P802 | AVERAGE VALUE IN RANGE END-START→AV1 | |
| P803 | AVERAGE VALUE IN RANGE AV1-START→AV2  VALUE IN RANGE END-AV1-START→D1, E1, S1 | |
| P804 | END=AV1 | IMAGE FEATURE DISCRIMINATION |
| P805 | AVERAGE VALUE IN RANGE END-AV2→AV3b  VALUE IN RANGE END-AV2-START→D2, E2, S2<br>AVERAGE VALUE IN RANGE AV2-START→AV3a | |
| P806 | IF S2 IS POSITIVE START=AV2, AV3=AV3a<br>IF S2 IS NEGATIVE END=AV2, AV3=AV3b | CHECK\|SK\|<0.125   AV=AV2<br>BATTERED CHARACTER PROCESSING   AV=AV2 |
| P807 | AVERAGE VALUE IN RANGE END-AV3→AV4b  VALUE IN RANGE END-AV3-START→D3, E3, S3<br>AVERAGE VALUE IN RANGE AV3-START→AV4a | BLURRED CHARACTER PROCESSING |
| P808 | IF S3 IS POSITIVE START=AV3, AV4=AV4a<br>IF S3 IS NEGATIVE END=AV3, AV4=AV4b | CHECK\|SK\|<0.125   AV=AV3 |
| P809 | AVERAGE VALUE IN RANGE END-AV4→AV5b  VALUE IN RANGE END-AV4-START→D4, E4, S4<br>AVERAGE VALUE IN RANGE AV4-START→AV5a | BLURRED CHARACTER PROCESSING   AV=AV3 |
| P810 | IF S4 IS POSITIVE START=AV4, AV5=AV5a<br>IF S4 IS NEGATIVE END=AV4, AV5=AV5b | CHECK\|SK\|<0.125   AV=AV4 |
| P811 | AVERAGE VALUE IN RANGE END-AV5→AV6b  VALUE IN RANGE END-AV5-START→D5, E5, S5<br>AVERAGE VALUE IN RANGE AV5-START→AV6a | BLURRED CHARACTER PROCESSING   AV=AV4 |
| P812 | IF S5 IS POSITIVE START=AV5, AV6=AV6a<br>IF S5 IS NEGATIVE END=AV5, AV6=AV6b | CHECK\|SK\|<0.125   AV=AV5 |
| P813 | AVERAGE VALUE IN RANGE END-AV6→AV7b  VALUE IN RANGE END-AV6-START→D6, E6, S6<br>AVERAGE VALUE IN RANGE AV6-START→AV7a | BLURRED CHARACTER PROCESSING   AV=AV5 |
| P814 | IF S6 IS POSITIVE START=AV6, AV7=AV7a<br>IF S6 IS NEGATIVE END=AV6, AV7=AV7b | CHECK\|SK\|<0.125   AV=AV6 |
| P815 | AVERAGE VALUE IN RANGE END-AV7→AV8b  VALUE IN RANGE END-AV7-START→D7, E7, S7<br>AVERAGE VALUE IN RANGE AV7-START→AV8a | BLURRED CHARACTER PROCESSING   AV=AV6 |
| P816 | IF S7 IS POSITIVE START=AV7, AV8=AV8a<br>IF S7 IS NEGATIVE END=AV7, AV8=AV8b | CHECK\|SK\|<0.125   AV=AV7 |
| P817 | AVERAGE VALUE IN RANGE END-AV8→AV9b  VALUE IN RANGE END-AV8-START→D8, E8, S8<br>AVERAGE VALUE IN RANGE AV8-START→AV9a | BLURRED CHARACTER PROCESSING   AV=AV7 |
| P818 | IF S8 IS POSITIVE START=AV8, AV9=AV9a<br>IF S8 IS NEGATIVE END=AV8, AV9=AV9b | CHECK\|SK\|<0.125   AV=AV8 |
| P819 | AVERAGE VALUE IN RANGE END-AV9→AV10b  VALUE IN RANGE END-AV9-START→D9, E9, S9<br>AVERAGE VALUE IN RANGE AV9-START→AV10a | BLURRED CHARACTER PROCESSING   AV=AV8 |
| P820 | IF S9 IS POSITIVE AV10=AV10a<br>IF S9 IS NEGATIVE AV10=AV10b | CHECK\|SK\|<0.125   AV=AV9 |
| P821 | | BLURRED CHARACTER PROCESSING   AV=AV9 |
| P822 | | AV=AV10 |

TH=AV

0 BLACK   85   255 WHITE

|  | START | END | AV | SK |
|---|---|---|---|---|
| FIRST LOOP | 0 | 255 | 109 | -27.4 |
| SECOND LOOP | 0 | 109 | 62 | 8.9 |
| THIRD LOOP | 62 | 109 | 84 | 1.9 |
| FOURTH LOOP | 84 | 109 | 96 | 0.6 |
| FIFTH LOOP | 96 | 109 | 102 | -0.3 |
| SIXTH LOOP | 96 | 102 | 98 | 0.3 |
| SEVEVTH LOOP | 98 | 102 | 99 | 0.4 |
| EIGHTH LOOP | 99 | 102 | 100 | 0.2 |
| NINTH LOOP | 100 | 102 | 101 | -0.2 |
| 10TH LOOP | 100 | 101 | 100 | 0.2 |

0 BLACK    95        255 WHITE

|              | START | END | AV  | SK    |
|--------------|-------|-----|-----|-------|
| FIRST LOOP   | 0     | 255 | 130 | -60.2 |
| SECOND LOOP  | 0     | 130 | 95  | -19.3 |

IMAGE PROCESSING METHOD AND APPARATUS FOR DETERMINING A BINARIZATION THRESHOLD VALUE USED FOR BINARIZING A MULTI-VALUED IMAGE AND PERFORMING BINARIZATION PROCESSING

BACKGROUND OF THE INVENTION

The present invention relates to an image processing apparatus and method and, for example, to an image processing method for determining binarization threshold values on the basis of a multi-valued image and performing binarization.

In recent years, image processing techniques have advanced remarkably, and image processing apparatuses which can perform processing of multi-valued images such as full-color images, character recognition processing in multi-valued images, and the like have become popular.

In such image processing techniques, binarization processing of multi-valued images is an indispensable technique. As conventional binarization methods, a simple binarization method based on a predetermined fixed threshold value, the Otsu's method which determines a binarization threshold value corresponding to the maximum inter-class variance obtained when the histogram is divided into two classes based on a certain threshold value (Otsu, "Automatic Threshold Value Selection Method Based on Discrimination and Least Square Criteria", *Journal of Papers of The Institute of Electronics, Information and Communication Engineers*, vol. J63-D, No. 4, pp. 349–356, 1980), a binarization method for setting the threshold values in correspondence with the local densities in a gradation image, and the like, are known.

In the simple binarization method based on a fixed threshold value, it is difficult to set an appropriate threshold value between the object density and the background density in an image, and as a consequence, the entire image is battered in black or white. On the other hand, in the Otsu's method, when the distributions of the two classes are extremely different from each other, the threshold value tends to be offset to the larger class of the two, thus generating a binary image with many noise components.

The above-mentioned problem is similarly posed when an original image including both picture and character portions is to be binarized. In the simple binarization method based on a fixed threshold value, it is difficult to set a threshold value suitable for both the picture and character portions. As a consequence, if the threshold value is preferentially determined for the picture portion, the character portion is battered. On the other hand, when the threshold value is preferentially determined for the character portion, the picture portion is battered or blurred. In the Otsu's method, when the picture and character portions have different features in the distributions of the two classes, and the distributions of the two classes are extremely different from each other, the threshold value tends to be offset to the larger class of the two and, hence, a binary image including many noise components is generated. Furthermore, in the binarization method that sets the threshold value in correspondence with the local density, when a character portion is present on the background, even the background is reproduced to have density, and a binary image which includes many noise components in the character portion is generated.

Conventionally, the numeric operation method on a computer includes an integer operation and a floating-point operation. The integer operation is executed at high speed within the integer effective number range (from 32767 to −32768 for 16-bit integers) that can be processed by a computer, and is executed at higher speed within the internal integer effective number range (this depends on the processing environment such as a CPU, system, and the like) of the computer. On the other hand, since the floating-point operation is executed using numbers having a mantissa and an exponent, it can express various numbers from large numbers to decimal fractions.

Also, upon constituting an operational block using an operational circuit in place of computation by means of a computer program, a method of constituting such block using a floating-point operational circuit, and a method of constituting such block using an integer operational circuit are available.

However, the numeric operation method used upon determining binarization threshold values in the above-mentioned numeric operation apparatus for image processing has the following problems.

When a numeric operation for image processing is performed by the integer operation, the operation speed is greatly higher than that in the floating-point operation. However, errors are generated since the decimal part is rounded off in, e.g., a division, and such errors are apt to accumulate when repetitive arithmetic operations include a division. As a consequence, high precision cannot be maintained. Also, the integer range is limited; the integer operation cannot process a large number beyond the range and a decimal fraction.

When a numeric operation for image processing is attained by the floating-point operation, high precision can be maintained, but the arithmetic operation speed is low, resulting in a long processing time. Since quite a few CPUs have no floating-point operational units, the processing time is further prolonged when such CPU is used.

In the arithmetic operation attained by hardware, when the floating-point operational circuit is used, the arithmetic operation speed is low and a large circuit scale is required. On the other hand, when the integer operational circuit is used, arithmetic operation errors due to rounding off are enhanced.

The floating-point operation always requires an operation for normalizing the mantissas of the numbers to equalize the exponents. This operation requires a considerably high clock rate in addition/subtraction although it does not require such high clock rate in multiplication/division. If this operation is executed by a low clock rate, the hardware scale increases. In contrast to this, the integer operation or fixed-point number operation suffers problems of overflowing and low arithmetic operation precision due to rounding errors. In order to obtain high arithmetic operation precision equivalent to that in the floating-point operation by the integer operation, the number of digits of an operational circuit can only be increased, and in such case, an increase in hardware scale or a decrease in operating frequency cannot be avoided.

SUMMARY OF THE INVENTION

The present invention has been made in consideration of the above-mentioned techniques, and has as its object to provide an image processing method which can attain very high-speed processing upon determining binarization threshold values used for binarizing a multi-valued image, and performing the binarization processing.

It is another object of the present invention to provide an image processing method, which can maintain predetermined precision within the limited integer effective number range that can be processed by a computer in the arithmetic operation for image processing of a multi-valued image, and can especially attain high-speed repetitive arithmetic operations while allowing convergence of large numbers as well as small numbers.

It is still another object of the present invention to provide an image processing method which can automatically set appropriate binarization threshold values for a character portion and a portion other than the character portion in an image at high speed.

In order to achieve the above objects, according to the present invention, in an image processing method for determining binarization threshold values used for binarizing a multi-valued image, and performing binarization processing, when the binarization processing is performed in units of blocks each consisting of a plurality of pixels and having a predetermined size, line-sequential data input processing, block-sequential threshold value determination processing, and line-sequential binarization processing are realized by pipeline processing.

In the numeric operation for the processing for determining binarization threshold values, the value the operand may assume is predicted based on the operational formulas of the arithmetic operation and numerical data used in the operation, and the decimal point position of the arithmetic operation is determined based on the predicted value to drop some digits of the operand or to shift its mantissa to the left, thereby controlling the final operation result to fall with a predetermined effective digit number range.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a table for explaining the threshold value determination processing;

FIG. 18 is a timing chart in the threshold value operational unit;

DETAILED DESCRIPTION OF THE PREFERRED EMBODIMENTS

Prior to the description of the pipeline processing according to the present invention, a method that can automatically set a proper binarization threshold value between the object density and the background density in an image will be described below.

Figure 1:
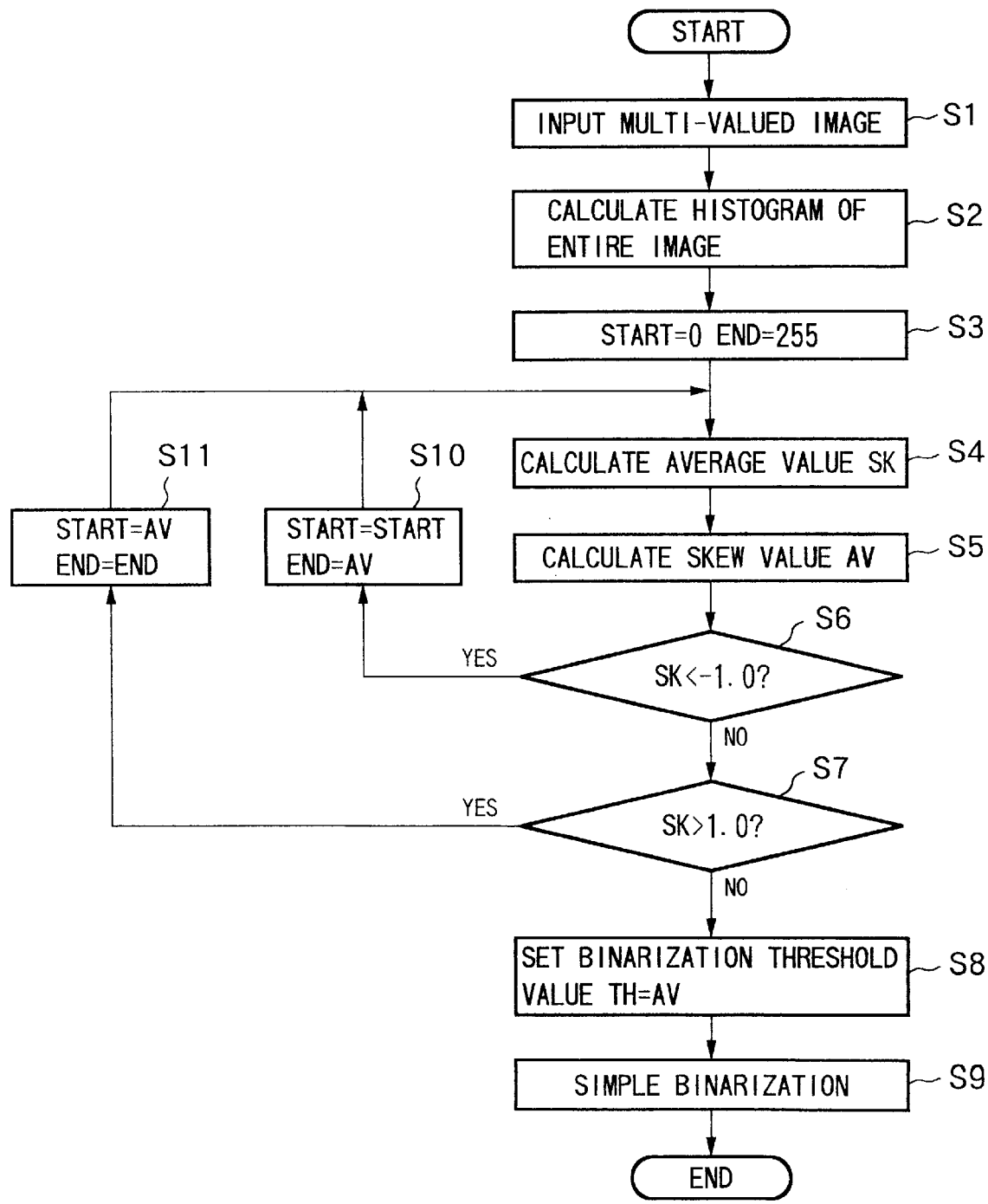
FIG. 1 is a flow chart for explaining threshold value determination processing.
Figure 2:
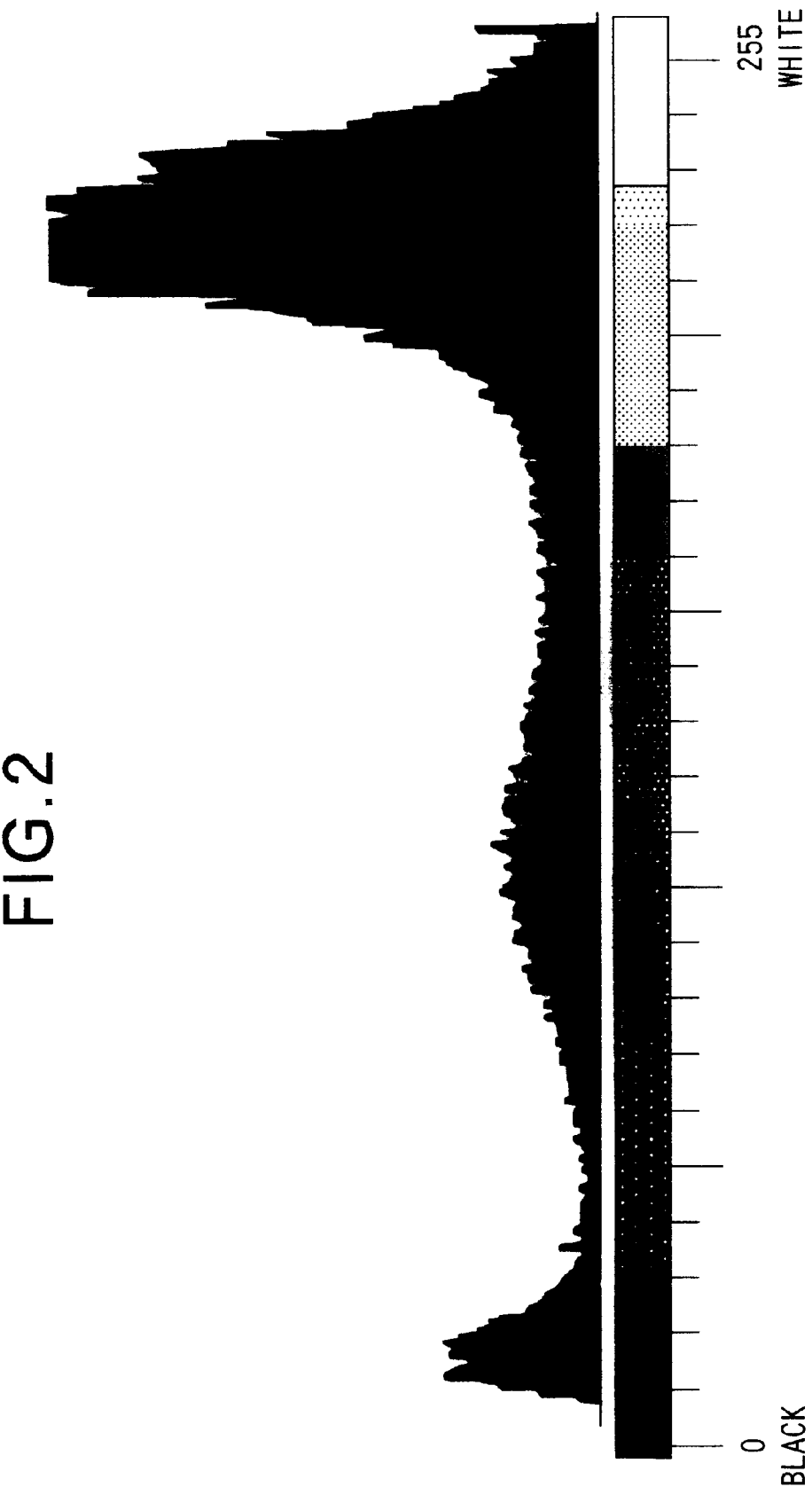
FIG. 2 is a graph for explaining the threshold value determination processing.

Referring to FIG. 1, an 8-bit multi-valued image is input in step S1. Note that the multi-valued image is input from an image input apparatus such as a scanner. In step S2, the histogram of the entire input image is calculated. In this case, all the pixels in the image are used, and the frequencies corresponding to 8 bits, i.e., digital values ranging from "0" to "255", are calculated. With this calculation, for example, a histogram shown in FIG. 2 is obtained.

In step S3, "0" and "255" are respectively set in parameters START and END. The parameters START and END respectively correspond to the start and end points of a statistical quantity of the luminance value calculated in steps S4 and S5 later.

In step S4, an average value AV of pixels corresponding to digital values from START to END is calculated. For example, when START=0 and END=255, the average value AV of pixels having values from "0" to "255" (all the pixels in this case) is calculated; when START=0 and END=177, the average value AV of pixels having values from "0" to "177" is calculated.

In step S5, a skew value SK of pixels corresponding to the luminance values from START to END is calculated. The skew value is a statistical quantity representing the skew of the histogram distribution. The skew value is calculated using the following equation:

$$SK=(\Sigma(Xi-AV)^3)/D$$

where Xi is the luminance value of each pixel. D is the variance of the entire image, and is given by:

$$D=\Sigma(Xi-AV)^2$$

In the above equation, the skew value is calculated by cubing the difference between the luminance value of each pixel and the average value, but the present invention is not limited to cubing as long as the exponent is an odd value.

In steps S6 and S7, the skew direction of the histogram is discriminated. In step S6, the skew direction of the histogram is checked using the following relation. This is to check if the skew of the histogram falls within the value range smaller than the average value AV.

SK<−1.0

If the above relation holds in step S6, the flow advances to step S10; otherwise, the flow advances to step S7. In step S10, START remains the same, and the average value AV is set in END. The flow returns to step S4 to calculate the average value AV from the START value to the END value again.

In step S7, the skew direction of the histogram is checked using the following relation. This is to check if the skew of the histogram falls within the value range larger than the average value AV.

SK>1.0

If the relation holds in step S7, the flow advances to step S11; otherwise, the flow advances to step S8. In step S11, the average value AV is set in START, and END remains the same. The flow returns to step S4 to calculate the average value AV from the START value to the END value again.

On the other hand, when neither of the above relations hold in steps S6 and S7, the average value AV is set as a binarization threshold value TH in step S8. In step S9, simple binarization processing using the binarization threshold value TH is performed.

The binarization processing will be described in more detail below with reference to an example of an image.

The determination processing of the binarization threshold value TH will be explained below using an example of the histogram shown in FIG. 2.

FIG. 2 shows the histogram of a certain image (8-bit input). Referring to FIG. 2, the abscissa plots the digital values of luminance levels (the left end="0", i.e., black; the right end="255", i.e., white), and the ordinate plots the frequencies of the digital values. FIG. 3 shows changes in parameter values when the image having the histogram shown in FIG. 2 is subjected to processing in steps S4 and S5 in the binarization processing shown in FIG. 1. Note that FIG. 3 shows the parameter values in correspondence with the number of loops of steps S4 and S5.

In the first loop of processing in steps S4 and S5, the average value AV and the statistical quantity SK are calculated using START=0 and END=255 to respectively yield values "177" and "−78.9". In this case, since the statistical quantity SK is less than "−1.0", START=0 and END=177 are set in step S10.

In the second loop of processing, the average value AV and the statistical quantity SK are calculated using START=0 and END=177 to respectively yield values "91" and "−8.6". In this case as well, since the statistical quantity SK is less than "−1.0", START=0 and END=91 are set in step S10.

In the third loop of processing, the average value AV and the statistical quantity SK are calculated using START=0 and END=91 to respectively yield values "43" and "9.6". In this case, since the statistical quantity SK exceeds "1.0", START=43 and END=91 are set in step S11.

In the fourth loop of processing, the average value AV and the statistical quantity SK are calculated using START=43 and END=91 to respectively yield values "72" and "−7.0". In this case, since the statistical quantity SK is less than "−1.0", START=43 and END=72 are set in step S10.

Subsequently, in the fifth loop of processing, the average value AV and the statistical quantity SK are calculated using START=43 and END=72 to respectively yield values "58" and "−2.2". In this case as well, since the statistical quantity SK is less than "−1.0", START=43 and END=58 are set in step S10.

Finally, in the sixth loop of processing, the average value AV and the statistical quantity SK are calculated using START=43 and END=58 to respectively yield values "50" and "−0.4". Since the statistical value SK falls within the range between "−1.0" and "1.0", the conditions in steps S6 and S7 are not satisfied, and the flow advances to step S8 to set "50" as the binarization threshold value TH. In step S9, simple binarization processing using the binarization threshold value TH is performed.

In this manner, the binarization threshold value is determined, so that the skew value converges to a predetermined value, and binarization is performed using the determined value. More specifically, in an input multi-valued image, a region where a threshold value most suitable for separating the background and object in an image is specified on the basis of the luminance frequencies and offset, and thereafter, the average luminance value of the specified region is determined to be the threshold value.

According to the above-mentioned threshold value determination method, although an appropriate threshold value can be set between the object density and the background density, when the processing flow shown in FIG. 1 is executed without any modifications, since the way of convergence of the operation range of luminance frequency information varies depending on the input image of interest, the number of arithmetic operations required for calculating the threshold value considerably differs between the minimum and maximum cases. For this reason, in order to perform this arithmetic operation within a predetermined period of time, the processing frequency must be increased, thus bottlenecking high-speed processing.

[First Embodiment]

The pipeline processing that can attain very high-speed determination processing of a binarization threshold value used upon binarizing a multi-valued image will be explained below.

Figure 4:
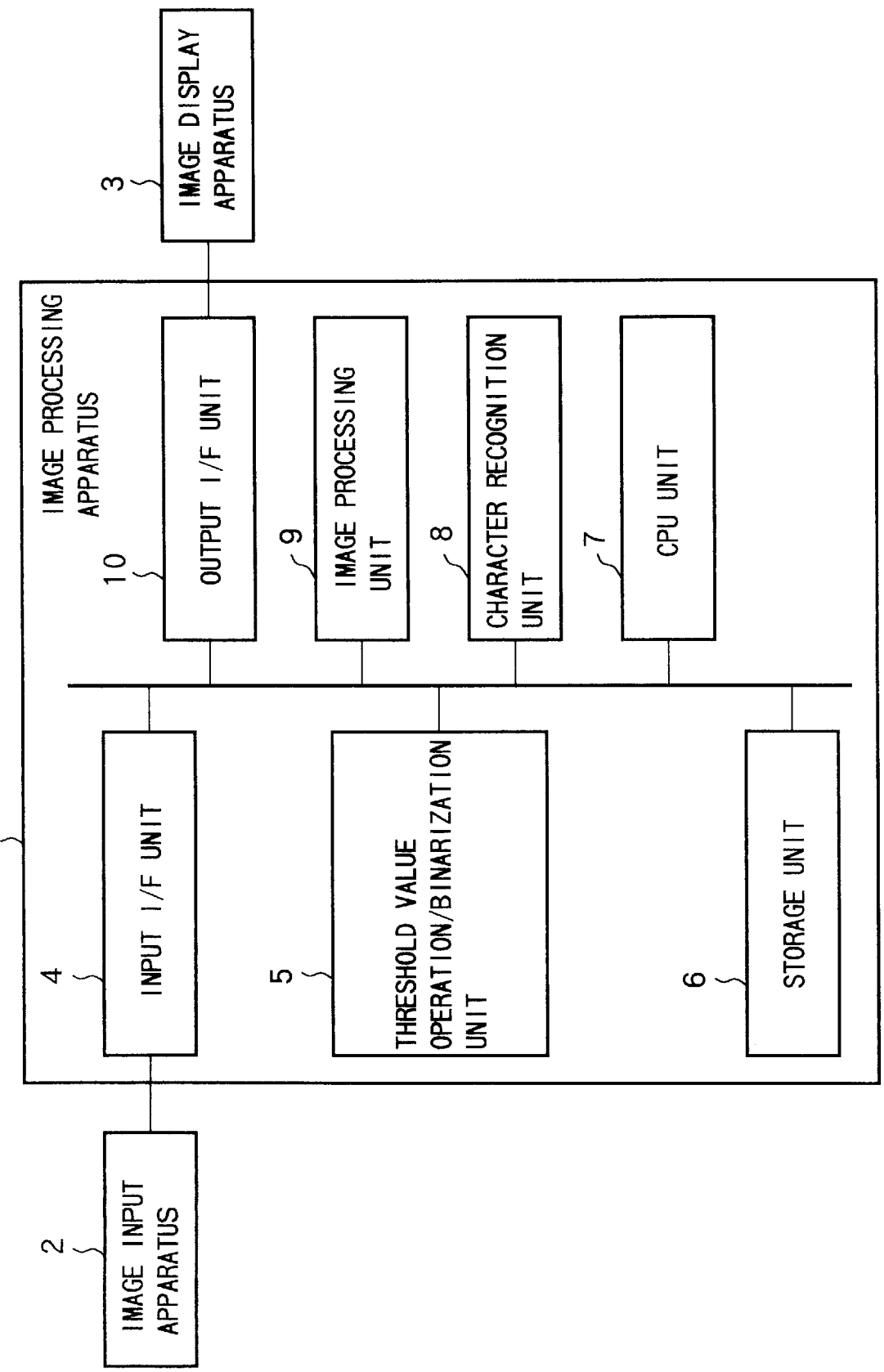
FIG. 4 is a block diagram showing the arrangement of the overall image processing apparatus according to the first embodiment of the present invention.

FIG. 4 is a block diagram showing the arrangement of a system for executing the binarization processing in this embodiment. Referring to FIG. 4, reference numeral 1 denotes an image processing apparatus for performing binarization processing, character recognition processing, and the like of an image; 2, an image input apparatus such as a scanner for inputting an image; and 3, an image display apparatus for displaying the processed image.

In the image processing apparatus 1, reference numeral 4 denotes an input interface unit serving as an interface with the image input apparatus 2; and 5, a threshold value operation/binarization unit for calculating the binarization threshold value on the basis of an input multi-value image and performing binarization processing of the multi-valued image. Reference numeral 6 denotes a storage unit for storing image data; and 7, a CPU unit for controlling the entire image processing apparatus. The CPU unit 7 comprises a CPU, ROM, RAM, and the like. Reference numeral 8 denotes a character recognition unit for performing character recognition processing for a region extracted as a character region; 9, an image processing unit for performing various kinds of image processing for a region separated as a region other than the character region, and image layout processing; and 10, an output interface unit serving as an interface with the image display apparatus 3 (the processing of the character recognition unit 8 and the image processing unit 9 may be realized by software programs executed by the CPU unit 7).

In the above-mentioned arrangement, multi-valued image data input from the image input apparatus 2 via the input interface unit 4 is input to the threshold value operation/ binarization unit 5. The threshold value operation/ binarization unit 5 calculates the threshold values in units of predetermined regions (each consisting of 64×64 pixels), and converts multi-valued image data of 64×64 pixels into a binary image. The threshold value operation/binarization unit 5 will be described in detail later. The converted binary image data is stored in the storage unit 6. Of the images stored in the storage unit 6, an image determined as a character region is subjected to character recognition processing, and is converted into character codes.

Figure 5:
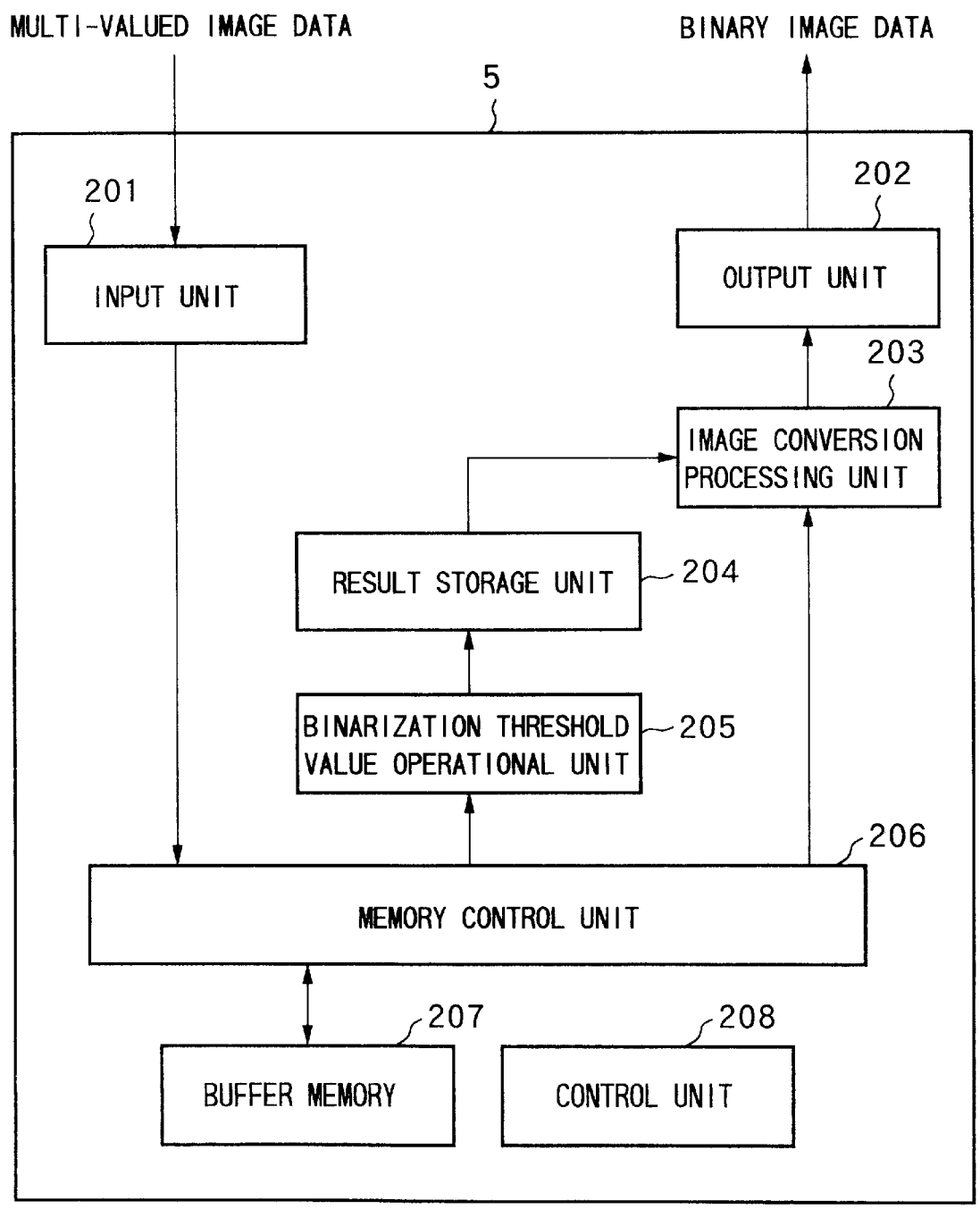
FIG. 5 is a block diagram showing the arrangement of a threshold value operation/binarization unit.

FIG. 5 shows the internal arrangement of the threshold value operation/binarization unit 5.

In the threshold value operation/binarization unit 5, reference numeral 201 denotes an input unit for inputting multi-valued image data; and 207, a buffer memory for storing image data input from the input unit 201 and corresponding to the number of lines of a predetermined region. Reference numeral 206 denotes a memory control unit for controlling data input/output of the buffer memory 207; and 205, a binarization threshold value operational unit for calculating the luminance frequencies in units of predetermined regions of an input image and corresponding binarization threshold values. Reference numeral 204 denotes a result storage unit which can store threshold value data obtained by the binarization threshold value operational unit 205 for a plurality of bands; 203, an image conversion processing unit for generating a binary image from a multi-valued image; and 202, an output unit for outputting the converted binary image. Reference numeral 208 denotes a control unit for controlling the entire threshold value operation/binarization unit 5 upon receiving an instruction from the CPU unit 7. Note that the threshold value operation/binarization unit 5 processes a multi-valued image as luminance data. In this fashion, 8-bit luminance data represents the darkest black by 0, and represents the lightest white by 255. Although the image input apparatus 2 and the image display apparatus 3 may have meanings of data different from the above-mentioned meanings, the input unit 201 and the output unit 202 perform inversion processing in such case.

Figure 6:
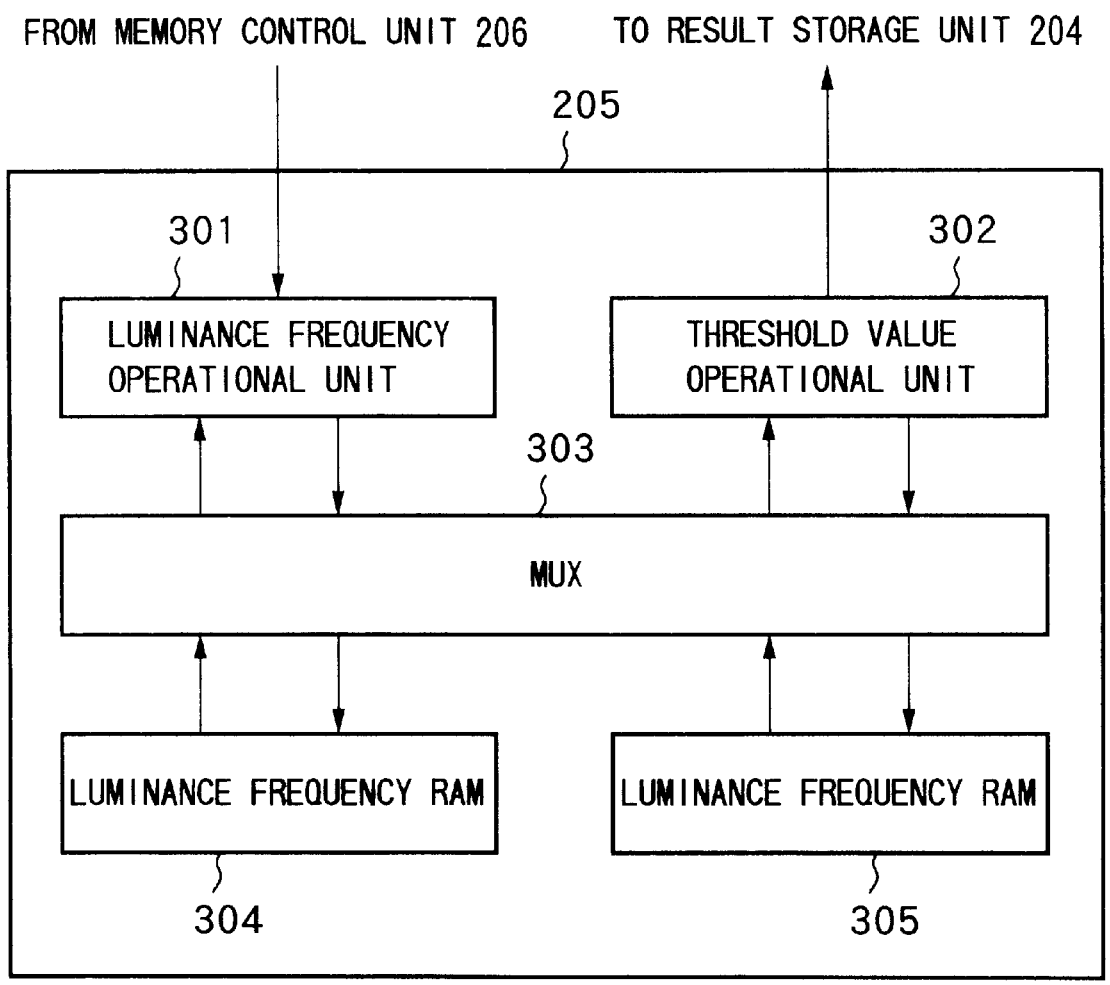
FIG. 6 is a block diagram showing the internal arrangement of a binarization threshold value operational unit 205.

FIG. 6 shows in detail the binarization threshold value operational unit 205.

Reference numeral 301 denotes a luminance frequency operational unit; 302, a threshold value operational unit; 303, a multiplexer; and 304 and 305, luminance frequency RAMs. Each of the luminance frequency RAMs 304 and 305 comprises a 2-port RAM having one read port and one write port, which are connected to the multiplexer 303. The RAMs 304 and 305 are alternately connected to the luminance frequency operational unit 301 and the threshold value operational unit 302 via the multiplexer 303.

Figure 7:
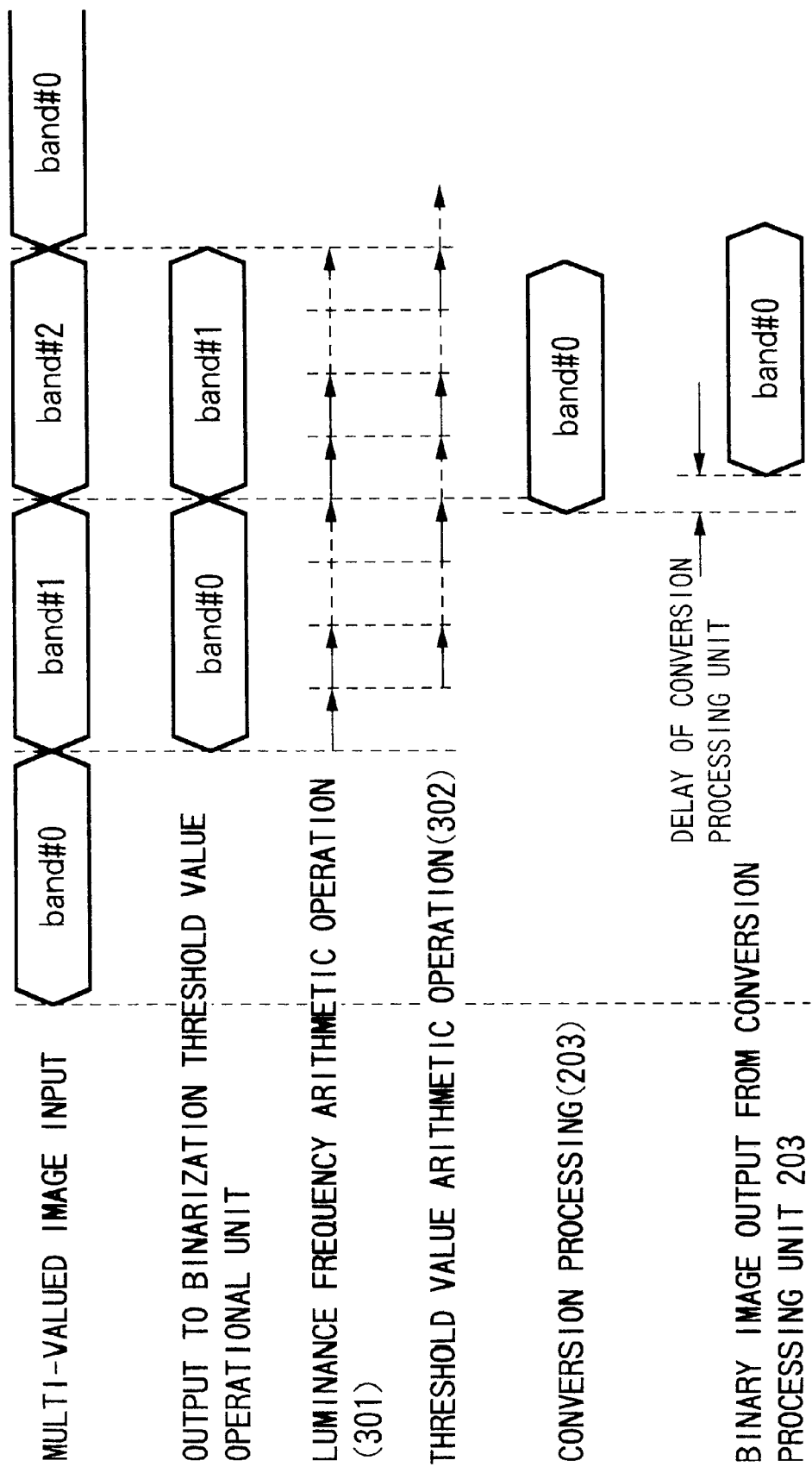
FIG. 7 is a chart for explaining the pipeline processing in the binarization threshold value operational unit.

FIG. 7 shows the operation timings of these units. In FIG. 5, multi-valued image data raster-sequentially input via the input unit 201 is written in the buffer memory 207 via the memory control unit 206. After data for 64 lines are input, 64×64 block data are sequentially read out from the buffer memory 207, and are input to the binarization threshold value operation unit 205 via the memory control unit 206. The luminance frequency operational unit 301 counts the frequencies in units of luminance levels in a 64×64 pixel block from the memory control unit 206. The frequencies in units of luminance levels are counted and stored in the luminance frequency RAMs at positions having luminance values as addresses. If the luminance frequencies of the first block are generated in the luminance frequency RAM 304, the luminance frequencies of the next block are generated in the luminance frequency RAM 305. The threshold value operational unit 302 starts its operation one block after the processing of the luminance frequency operational unit 301. More specifically, while the luminance frequency operation unit 301 processes the N-th block, the threshold value operational unit 301 processes the (N–1)-th block. The luminance frequency operational unit 301 and the threshold value operational unit 302 will be described in detail later. The threshold value calculated by the threshold value operational unit 302 is stored in the result storage unit 204. The binarization processing starts about 128 lines after the multi-valued image input timing.

Figure 8:
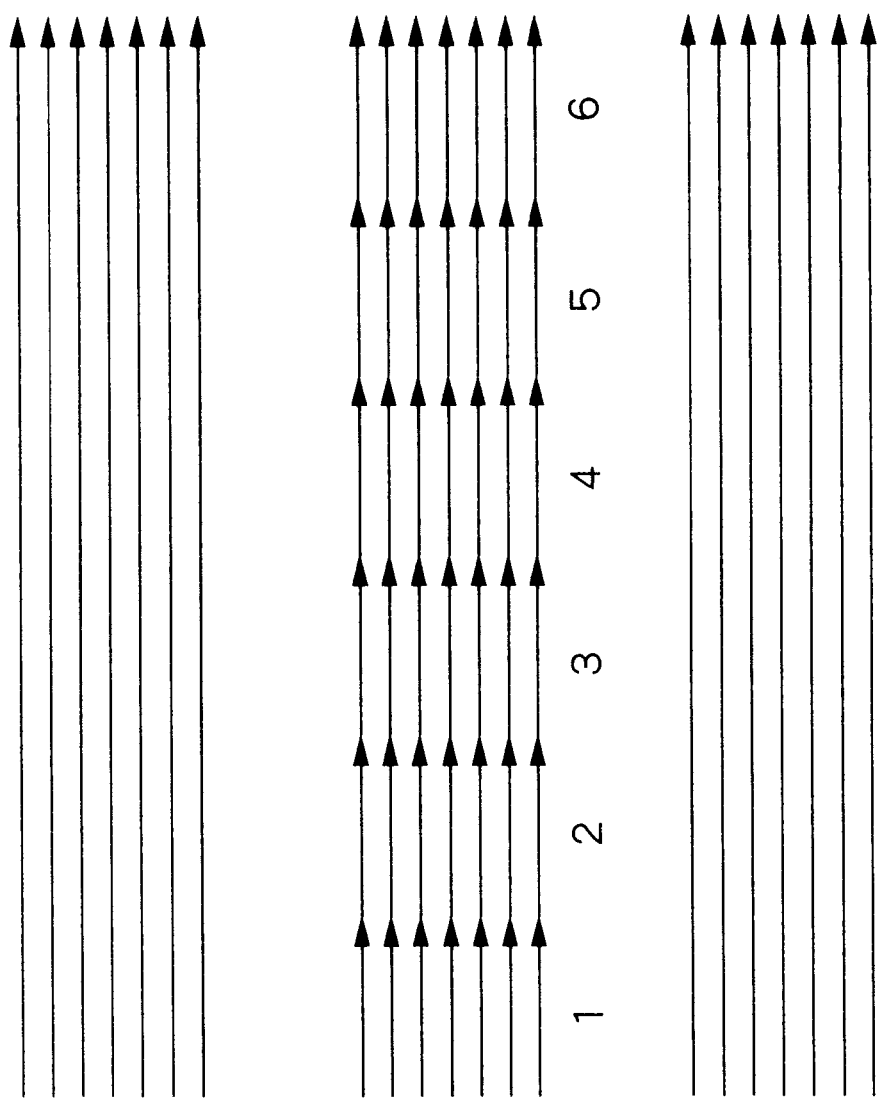
FIG. 8 is a chart for explaining the pipeline processing in the binarization threshold value operational unit.

FIG. 8 shows the flows of input/output data in the buffer memory 207. Multi-valued image data flows from the input unit to the buffer memory line-sequentially, data flows from the buffer memory to the output of the binarization threshold value operational unit block-sequentially (each block consists of 64 pixels×64 lines), and data flows from the buffer memory to the image conversion processing unit line-sequentially. Hence, data is also output from the image conversion unit 203 to the binary image output line-sequentially.

Figure 9:
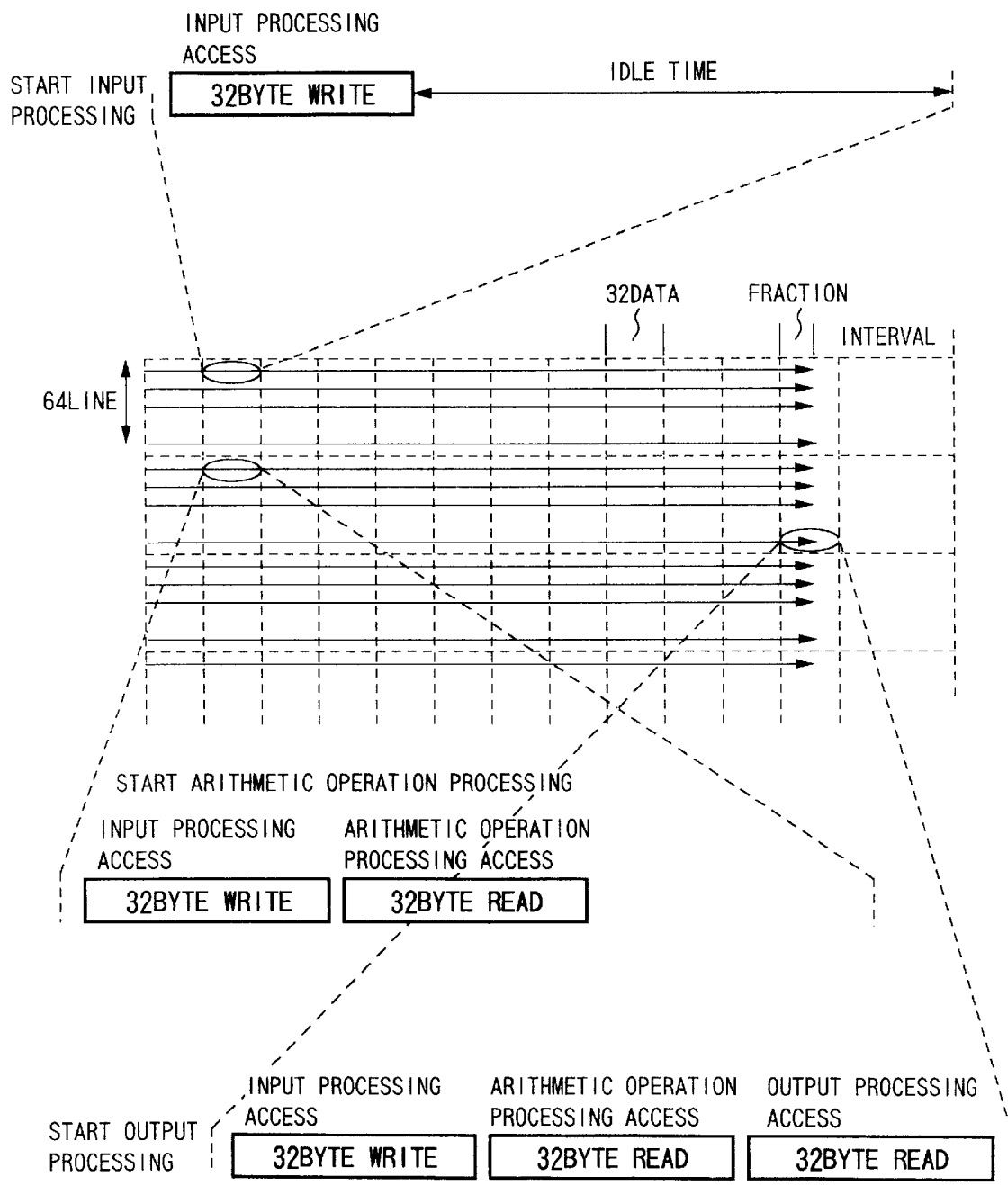
FIG. 9 is a chart showing the input/output processes of a buffer memory with respect to an input image.

FIG. 9 shows the input/output data of the buffer memory 207 with respect to the input image. Input, arithmetic operation, and output accesses are divisionally made. More specifically, when data is to be accessed in units of 32 pixels (32 bytes), the 32-byte input, arithmetic operation, and output accesses are made within a time corresponding to image input clocks for 32 pixels of the input multi-valued image (when contention among three accesses has occurred).

The input/output rate of the buffer memory is three times the image input rate, but is 1.5 times if the data width of the buffer memory is 16 bits. In this manner, by adjusting the data width of the buffer memory, an input/output rate suitable for the memory speed can be obtained. The memory control unit 206 includes small buffers (FIFO memories) of about 64 bytes (32 bytes×2) that absorb the difference between the image input rate and the input/output rate of the buffer memory. When the input, arithmetic operation, and output processing buffers are divided into banks, the buffers cannot be switched unless the processing for each bank ends. However, since this embodiment adopts buffers which are not physically separated, the respective processing operations can be freely started. Referring to FIG. 9, the start intervals of the input, arithmetic operation, and output accesses must be equal intervals. However, as can be seen from FIG. 9, the start timing of the output processing is set earlier. With this timing, the output time difference for the input of each line can be reduced.

Figure 10:
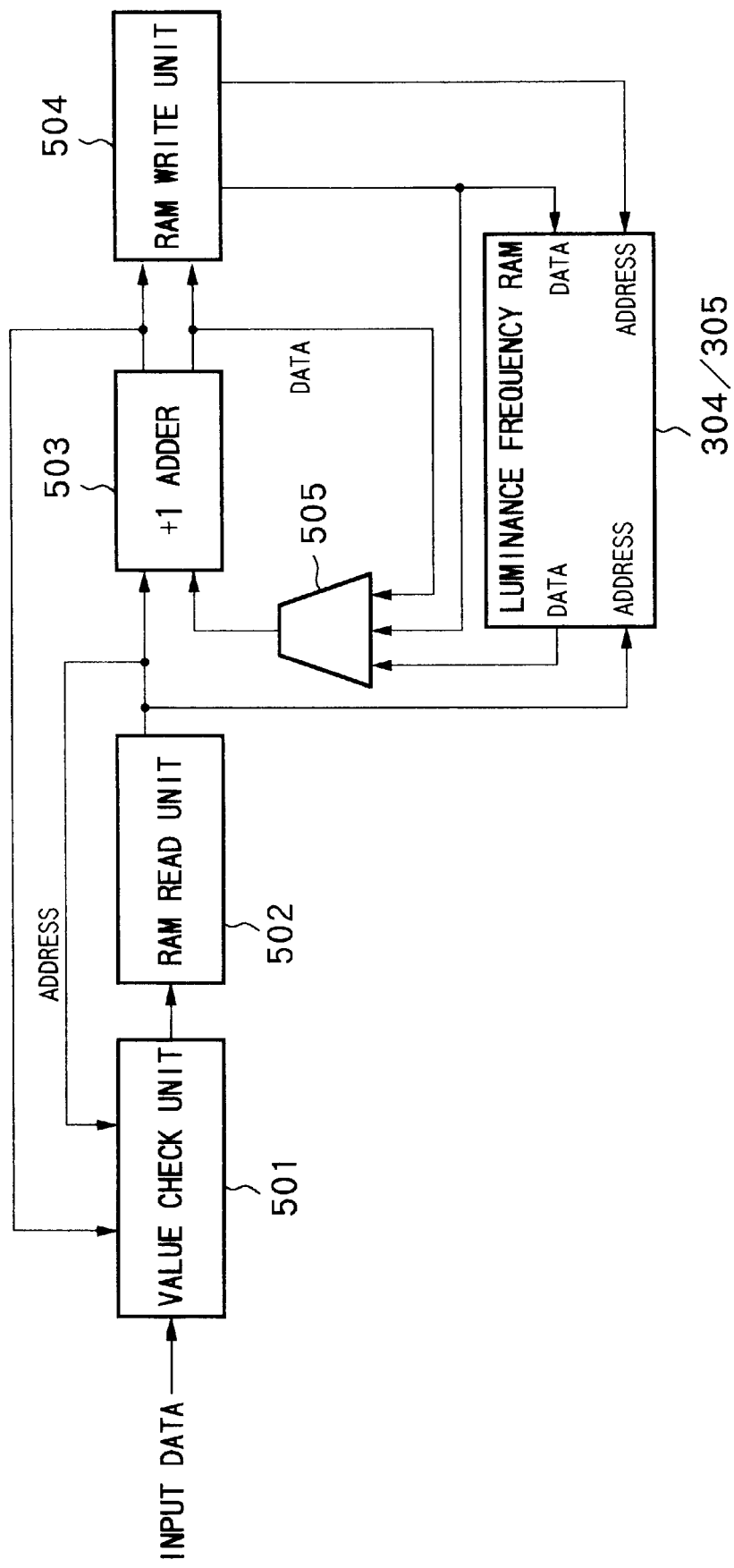
FIG. 10 is a block diagram showing the arrangement of a luminance frequency operational unit.
Figure 11:
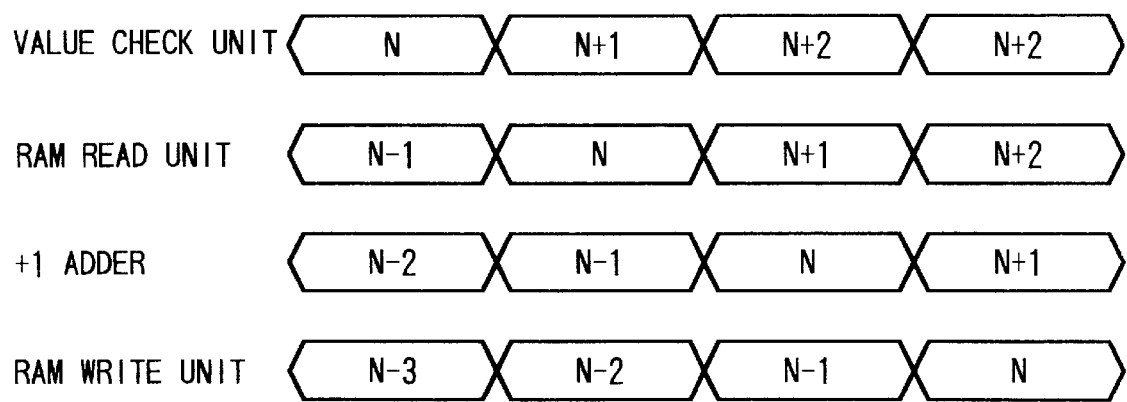
FIG. 11 is a chart showing the processing timings in the luminance frequency operational unit.

FIG. 10 shows the arrangement of the luminance frequency operational unit 301 and the relationship between the unit 301 and the luminance frequency RAM 304/305, and FIG. 11 shows the arithmetic processing timing of the luminance frequencies.

Reference numeral 501 denotes a value check unit for checking if identical luminance data are continuously input; 502, a RAM read unit for reading data, corresponding to the input luminance value, from the luminance frequency RAM 304/305; 503, a +1 adder for adding +1 to the data read out by the unit 502; 504, a RAM write unit writing back the data added with +1 to the luminance frequency RAM 304/305; and 505, a data multiplexer for avoiding pipeline breaks/delays. As shown in FIG. 11, the luminance frequency operational unit 301 processes checking of identical addresses (luminance values), memory reading, +1 addition processing, and write processing in a pipeline manner. However, when identical luminance data is input while data read out from the luminance frequency RAM is added by +1 and the sum data is written back, since data before +1 is added is processed in this state, the luminance frequencies cannot be correctly counted. In view of this problem, the value check unit 501 checks if identical data is present within the stages of the pipeline processing. For example, when the value check unit 501 processes the N-th data, it compares the N-th data with (N−1)-th and (N−2)-th data to check the presence of an identical value. If identical luminance data is found, the multiplexer 505 feeds back the found data, so that data read out from the luminance frequency RAM by the RAM read unit is ignored, thus correctly counting the luminance frequencies. When read and write accesses are concurrently made with respect to an identical address, the read access is inhibited. If the processing block consists of 64×64 pixels, the luminance frequency ranges from 0 to 4096 and requires a 13-bit wide memory, but is limited to 4095. In addition to these 12 bits, 1 bit is used as an initialization flag. The initialization flag is set to be 1 at the beginning of operation, and data which has the initialization flag=1 is processed as zero independently of the other 12 bits. The initialization flag is set by the threshold value operational unit 302 (to be described below).

Figure 12:
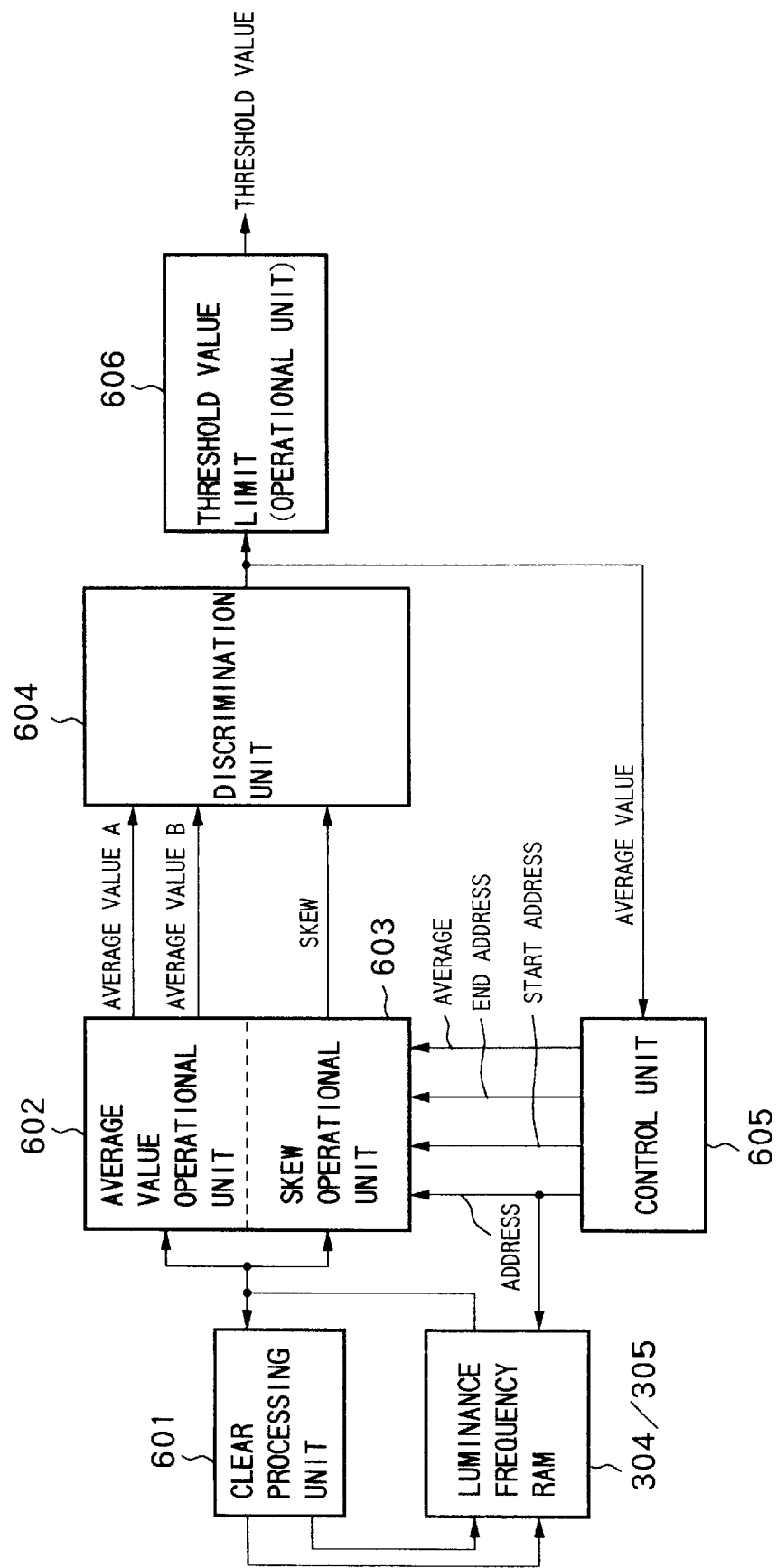
FIG. 12 is a block diagram showing the arrangement of a threshold value operational unit.

FIG. 12 shows the arrangement of the threshold value operational unit 302 and the relationship between the unit 302 and the luminance frequency RAM 304/305. Reference numeral 304/305 denotes a luminance frequency RAM which is a RAM using a luminance that assumes a value ranging from 0 to 255 as an address value.

Reference numeral 601 denotes a clear processing unit for performing processing of the initialization flags of the luminance frequency RAM 304/305. Reference numeral 602 denotes an average value operational unit for calculating the average luminance from the luminance frequencies within the designated range; 603, a skew operational unit for calculating the skew value from the luminance frequencies within the designated range. The output from the luminance frequency RAM 304/305 is connected to the average value operational unit 602 and the skew operational unit 603, and data read out from the RAM is parallelly input to these units. Reference numeral 604 denotes a discrimination unit which performs end discrimination upon receiving the outputs from the average value operational unit 602 and the skew operational unit 603. Reference numeral 605 denotes a control unit for controlling the entire unit 302, and mainly manages the range. Reference numeral 606 denotes a threshold value operational unit for processing the upper and lower limits of the threshold values.

The flow of the binarization threshold value determination processing in this embodiment will be described in detail below with reference to the flow charts in FIGS. 13 to 17.

In step S701, "0" and "255" are respectively set in parameters START and END. At the same time, flags MF, KF, and TF used in image feature discrimination, blurred character processing, and battered character processing (to be described later) are respectively initialized to "OFF, ON, and OFF", and "1" is set in a threshold value determination processing loop count i. The parameters START and END respectively correspond to the start and end points of statistical quantities (average value, skew value) of luminance values calculated in steps S702 and S704 (to be described later).

In step S702, an average value AV of pixels corresponding to digital values from START to END is calculated. For example, if START=0 and END=255, the average value AV of pixels having values from "0" to "255" is calculated; if START=0 and END=109, the average value AV of pixels having values from "0" to "109" is calculated.

Let k be the luminance value ranging from 0 to 255, and Pk or P(k) be the distribution function corresponding to the luminance value. Then, the average value AV is given by:

$$AV=\Sigma(k \times P(k))/\Sigma P(k) (k=\text{START} \ldots \text{END}) \quad (1)$$

In step S703, the threshold value determination processing loop count i is checked. If i="10", the flow jumps to step S718; otherwise, the flow advances to step S704.

In step S704, a skew value SK of pixels corresponding to the luminance values from START to END is calculated. The skew value is a statistical quantity indicating the skew of the histogram distribution. The skew value is calculated using the following equation (2):

$$SK=\Sigma((k-AV)^3 \times P(k))/\Sigma((k-AV)^2 \times P(k)) (k=\text{START} \ldots \text{END}) \quad (2)$$

In equation (2) that calculates the skew value, the denominator corresponds to the variance of the entire image, and the numerator is calculated by cubing the difference between the luminance value of each pixel and its average value. However, the present invention is not limited to cubing as long as the exponent is an odd value.

In step S705, the threshold value determination processing loop count i in one processing block is checked (to check if i=1, i.e., the current loop is the first loop). If i="1", the flow advances to step S706; otherwise, the flow advances to step S709. In step S706, image feature discrimination is performed to check if the block being processed is a "character block", and the flow then advances to step S718. The image feature discrimination will be described in detail later (steps S728 to S729, and S707 to S708). When it is determined that the block being processed is a character block, the flag MF is set to be "ON".

In step S709, the magnitude of the skew of the histogram is checked as per:

$$|SK|<0.125 \quad (3)$$

That is, it is checked if the absolute value of the skew value SK is less than "0.125". If relation (3) holds in step S709, the flow jumps to step S719; otherwise, the flow advances to step S710.

In step S710, blurred character processing is performed. If the condition in step S710 is satisfied, the flow jumps to step S719; otherwise, the flow advances to step S719. The blurred character processing will be described in detail later (steps S710, S730, S731, S712, and S713).

In step S711, the threshold value determination processing loop count i is checked. If i="2", the flow advances to step S712; otherwise, the flow advances to step S716. It is checked in step S714 to which the flow advances when i="2" if the block being processed is a "battered character block", and the corresponding processing is performed in step S715. Thereafter, the flow merges to step S716. The battered character processing will be described in detail later (steps S714, S732, S733, and S715). If it is determined that the block being processed is a battered character block, the battered character flag TF is set to be "ON".

In step S716, the skew direction of the histogram is checked using the following relation (4):

$$SK \geq 0 \quad (4)$$

If relation (4) holds in step S716 (this means that the skew of the histogram falls within the value range larger than the average value AV), the flow advances to step S717; otherwise (this means that the skew of the histogram falls within the value range smaller than the average value AV), the flow advances to step S718.

In step S717, the average value AV is set in START, and END remains the same. The flow then advances to step S734. In step S718, START remains the same, and the average value AV is set in END. The flow then advances to step S734. In step S734, the threshold determination processing loop count i is incremented by "1", and the flow returns to step S702 to calculate the average value AV from the START value to the END value again. In this manner, by setting a binarization threshold value so that the skew value SK converges to a predetermined value, the background is removed, and a clear binary image can be obtained.

In step S719, the average value AV is set as a threshold value TH. In steps S720 to S727, processing for limiting the obtained binarization threshold value is performed, and this processing will be described in detail later. After the threshold value limiting processing, the threshold value determination processing ends.

The binarization processing in this embodiment is performed, as described above. However, the present invention is not limited to the ranges defined by relations (3) and (4).

The binarization threshold value determination processing described above with reference to the flow charts is executed by the circuit shown in FIG. 12. In order to assure high arithmetic operation precision, the processing is modified as follows.

Since the luminance value k ranges from 0 to 255, the average value AV also ranges from 0 to 255. However, the skew value SK is calculated based on the difference value (k−AV) between the luminance value k and the average value AV. After repeating the arithmetic operation 10 times, since the arithmetic operation range between START and END narrows down, the difference value gradually decreases, and ΣPi similarly decreases. Accordingly, since the values of the denominator and numerator in equation (2) become smaller, the number of arithmetic operation digits of the denominator/numerator must be increased so as to assure the same effective number of digits of the skew value SK as in the first loop. In other words, the number of digits below the decimal point must be increased.

If X is (14−(the number of bits of (END−START)), equation (1) is rewritten by:

$$AV' = (\Sigma((i - \text{START}) \times P(k))) \times 2^X / \Sigma P(k) \quad (i = 0 \ldots (\text{END}-\text{START})) \quad (5)$$

The relationship between this value AV' and the original average value AV is:

$$AV = AV'/2^X + \text{START} \quad (6)$$

When START=0 and END=255 in the first loop (END−START falls within the 8-bit range), the average value AV can be calculated using 8 bits for the integer part and 7 bits for the decimal part. In this case, in the second loop and the subsequent loops, if (END−START) falls within the 7-bit range, since the integer part is 7 bits, processing can be attained by the same operational circuit even when the decimal part is calculated up to 8 bits. More specifically, in equation (5), since skew processing is realized by (k−START) and scaling is attained by X, the number of digits below the decimal point changes from 7 to 14 even when an identical division part is calculated by dividing 27 bits by 13 bits. The number of digits below the decimal point increases as the value of the denominator/numerator in equation (2) decreases.

Similarly, if Y is (12−(the number of bits of Σp(i))) (0 if Y assumes a negative value), equation (2) is modified as follows:

$$tmpA = (k - \text{START}) \cdot 2^X - AV' \quad (7)$$

$$tmpB = ((tmpA \times tmpA)/2^7) \times (p(k) \times 2^Y) \quad (8)$$

$$tmpC = \Sigma(tmpA \times \Sigma(tmpB/2^3)) \quad (9)$$

$$D = (\Sigma tmpB)/2^7 \quad (10)$$

$$E = |tmpC|/2^{X+5} \quad (11)$$

$$S \ldots \text{sign of } tmpC \quad (12)$$

$$SK' = E/D \quad (13)$$

where SK' equals |SK|.

Prior to the description of the internal arrangement of the respective units in FIG. 12, FIG. 18 shows the flow of the threshold value calculation processing in FIGS. 13 to 17. FIG. 18 roughly shows the flows of the operations of the average value operational unit 602, the skew operational unit 603, and the discrimination unit 604. In FIG. 18, portions which operate concurrently are shown juxtaposed, and the elapse of time corresponds to the vertical direction.

The following description will be given assuming that AVn and SKn (the previous values Dn, En, and Sn) respectively represent the n-th average value and skew value. In phase P801, initialization is made to have START=0 and END=255. In phase P802, data within the range from END to START are read out from the luminance frequency RAM 304/305 and are input to the average value operational unit 602. With this operation, an average value AV'1 of luminance values from luminance levels 255 to 0 is calculated. In the next phase P803, data within the range from 255 to 0 are also read out from the luminance frequency RAM 304/305 and are input to the skew operational unit 603 to calculate D1, E1, and S1. At the same time, an average luminance value AV'2 within the range from 0 to AV1 is calculated by the average value operational unit 602. In phase P804, AV1 is set in END. In phase P805, an average value AV'3b within the range from AV2 to END, and an average value AV'3a within the range from START to AV2 are calculated by the average value operational unit 602, and skew values D2, E2, and S2 within the range from END to START are calculated by the skew operational unit 603.

During the interval from phase P804 to phase P805, the discrimination unit 604 concurrently performs image feature discrimination using SK'1 by calculating D1/E1.

In phase P805, two average values AV3a and AV3b are calculated as the average value AV3. In the subsequent phase P806, if the sign of SK2, i.e., S2 is positive upon determining the next arithmetic operation range, AV3a is used as AV3; if the sign of S2 is negative, AV3 is used as AV3. Originally, whether the calculation range of AV3 is the one between START and AV2 or between AV2 and END is not determined until the arithmetic operation of SK2 is complete. However, since data within the ranges between START and AV2 and between AV2 and END are accessed to calculate SK2 (D2, E2, and S2), the average value operational unit 602 calculates two values, i.e., the average value AV3a within the range between START and AV2 and the average value AV3 b within the range between AV2 and END. Since data are time-sequentially input from the luminance frequency RAM 304/305 like data within the range between START and AV2 and data within the range between AV2 and END, there is no need for preparing a plurality of average value operational units 602. AV'3a, AV'3b, D2, E2, and S2 are input to the discrimination unit 604, which determines AV3 depending on the sign of S2 and outputs the determined AV3 to the control unit. The control unit 605 re-sets START and END based on the received average value to determine the next arithmetic operation range to start the next arithmetic operations of the average value and the skew value (AV4, D3, E3, and S3). At the same time, the discrimination unit 604 calculates D2/E2 to perform end discrimination of |SK2|<0.1 and battered character processing or blurred character processing. As will be described in detail later, since a battered character and a blurred character have conflicting natures, one of these processing operations is performed. When the end condition is satisfied as a result of such processing, AV2 is output as the threshold value TH, and the control unit 605 stops the operations of the average value operational unit 602 and the skew operational unit 603, which are in operation, thus ending all the processing operations.

When the end condition is not satisfied, similar processing continues. Finally, upon completion of the arithmetic operation of the 10th average value AV10, the end discrimination for SK9 is made. If the end condition is satisfied, AV9 is output as the threshold value TH; otherwise, AV10 is output as the threshold value TH, thus ending the processing.

In this manner, the average value operational unit 602, the skew operational unit 603, and the discrimination unit 604 concurrently operate to perform arithmetic operations. That is, if the discrimination unit 604 is executing the n-th arithmetic operation, the skew operational unit 603 and the average value operational unit 602 are respectively executing the (n+1)-th and (n+2)-th arithmetic operations in a pipeline manner. However, since the arithmetic operations of the average value operational unit 602 and the skew operational unit 603 are realized not as simple pipeline operations but as synchronous operations, processing can be made using only one luminance frequency RAM 304/305.

When the average value operational unit 602 receives three values START, AVn, and END, it must access luminance data at an address corresponding to AVn twice to obtain the average values between START and AVn and between AVn and END. For example, when the arrangement shown in FIG. 19 is adopted, the unit 602 need only access the RAM once.

Figure 19:
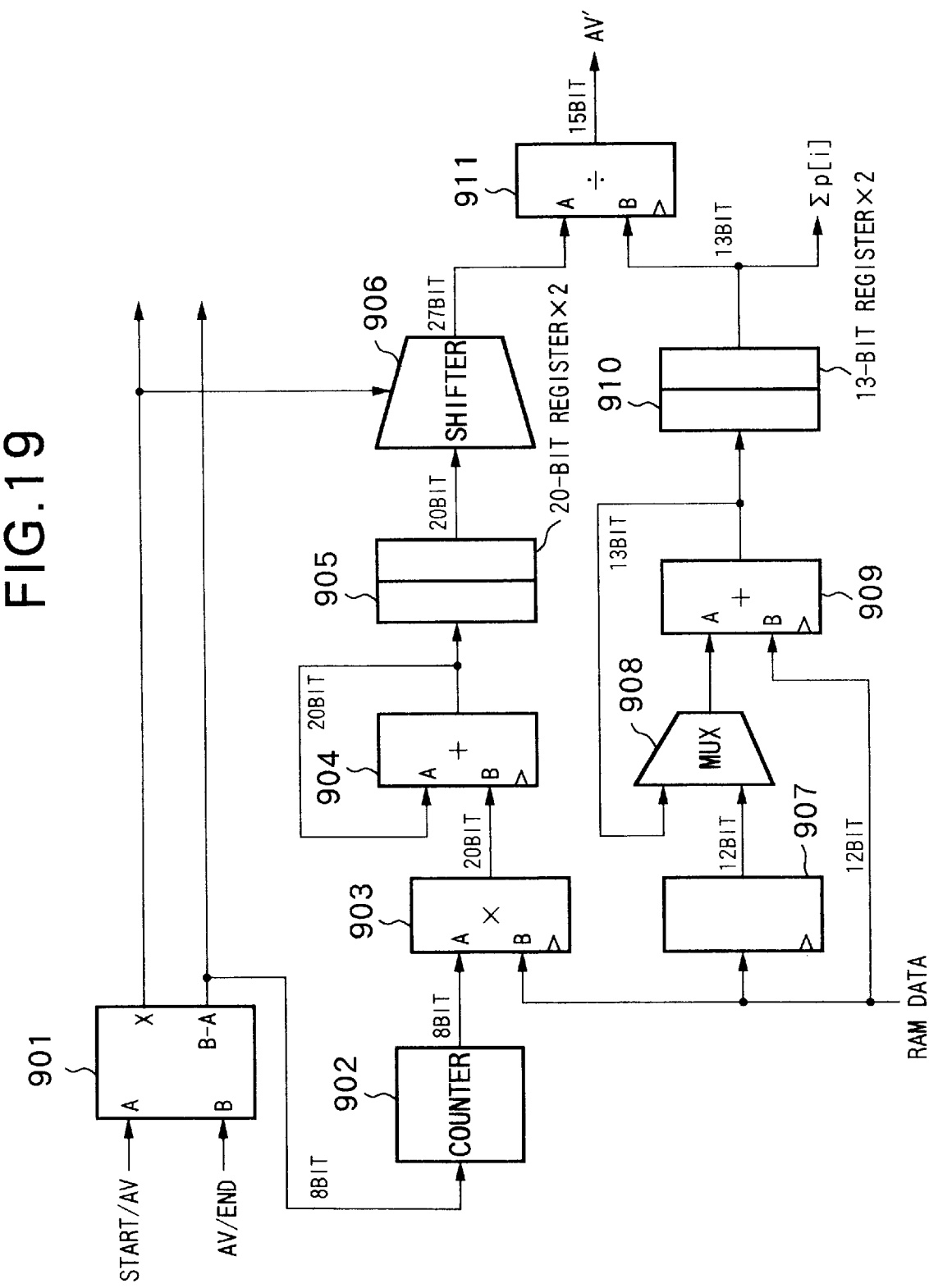
FIG. 19 is a block diagram showing the arrangement of an average value operational unit.

FIG. 19 is a block diagram showing in detail the arrangement of the average value operational unit 602.

Data in the luminance frequency RAM 304/305 are accessed from 255 to 0. Reference numeral 901 denotes an operational circuit for obtaining values END−START and x using the input values START and END. since this average value operational unit 602 calculates two average values, inputs A and B receive values START, AVn, and END in practice.

Reference numeral 902 denotes a counter for receiving the value END−START and down-counting the value to 0; and 903, a multiplier for multiplying inputs A and B. The input A of the multiplier 903 receives the luminance value, i.e., the address value upon reading out data from the luminance frequency RAM 304/305—the value START, that is, the output from the counter 902, and its input B receives the readout frequency data. The multiplier 903 makes an arithmetic operation (k−START)×P(k). Reference numeral 904 denotes an adder which makes an arithmetic operation Σ(k−START)×P(k). Reference numeral 905 denotes a register for holding two outputs from the adder 904. Reference numeral 906 denotes a shifter for shifting the output from the register 905 in accordance with the value X obtained by the operational circuit 901. This shift amount determines the number of digits below the decimal point of AV'n. Reference numeral 907 denotes a temporary register for temporarily holding luminance data at an address corresponding to AVn. Reference numeral 908 denotes a multiplexer; and 909, an adder. The multiplexer 908 selects whether the data output from the register 907 is input to the adder 909 or the output from the adder 909 is fed back to the adder 909, and normally selects the output from the adder 909 to feed it back to the adder 909. The adder 909 makes an arithmetic operation Σp(k).

Reference numeral 910 denotes a register which holds the value output from the adder 909 after the data in the adder 909 is determined. Since two average values must be obtained, the register 910 has a capacity capable of storing two outputs. Reference numeral 911 denotes a divider for receiving data from the registers 905 and 910, and calculating the average value.

The register 907 delays data P(k). Initially, the adders 904 and 909 are initialized to 0, and start arithmetic operations from k=END. After the adders 904 and 909 calculate data corresponding to k=AVn, their outputs are saved in the registers 905 and 910. Upon calculating data corresponding to k=AVn+1, the multiplexer 908 selects the data output from the register 907, and the adder 909 makes an arithmetic operation P(AVn)+P(AVn+1). In the adder 904, as for the values of repetitive data, since the input A side assumes 0, no temporary register for the purpose of delaying is required. Thereafter, upon completion of arithmetic operations until k=START, the results are output to the registers 905 and 910.

In this way, since each data need only be read out once, the skew operational unit 603 need not be stopped to attain synchronization after the average value operational unit 602 and the skew operational unit 603 start their operations.

Figure 20:
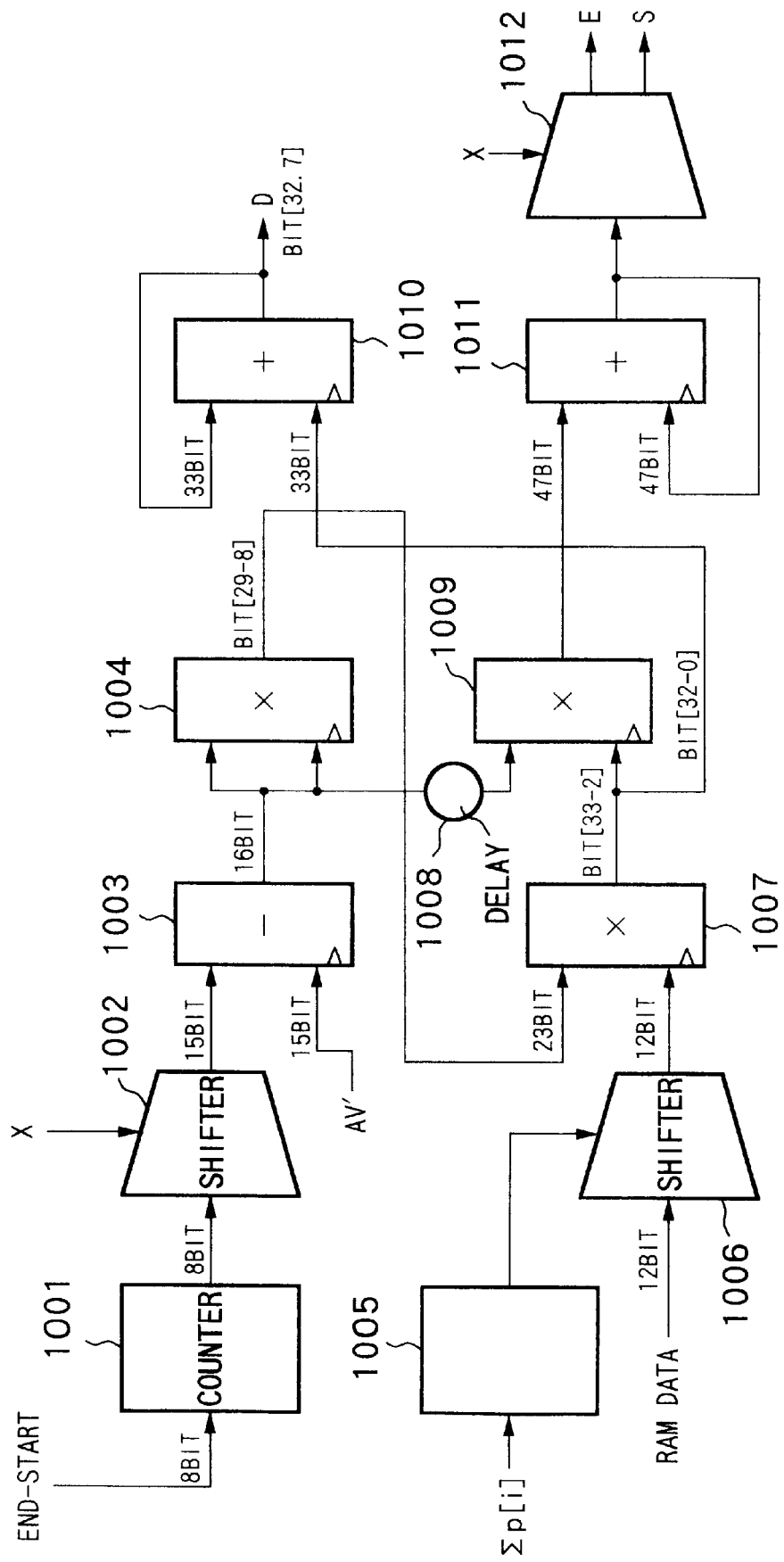
FIG. 20 is a block diagram showing the arrangement of a skew operational unit.

FIG. 20 is a block diagram showing the arrangement of the skew operational unit 603.

Reference numeral 1001 denotes a counter, which loads the value END−START and down-counts it to 0. Reference numeral 1002 denotes a shifter which receives X calculated by the average value operational unit 602, and makes an arithmetic operation (k−START)×2X. Reference numeral 1003 denotes a subtracter which makes an arithmetic operation (k−START)×2X−AV', i.e., tmpA. Reference numeral 1004 denotes a multiplier which makes an arithmetic operation tmpA×tmpA. Reference numeral 1005 denotes an operational circuit which obtains Y from the value ΣP(k)

calculated by the average value operational unit 602. Reference numeral 1006 denotes a shifter which makes an arithmetic operation (P(k)×2$^Y$) using the value Y and the luminance distribution amount P(k). Reference numeral 1007 denotes a multiplier which makes an arithmetic operation ((tmpA×tmpA)/2$^7$)×(p(k)×2$^Y$), i.e., tmpB. Reference numeral 1008 denotes a delay for delaying the output from the subtracter 1003 by the number of arithmetic operation clocks required for the multipliers 1004 and 1007. Reference numeral 1009 denotes a multiplier which makes an arithmetic operation tmpA×(tmpB/2$^2$). Reference numeral 1010 denotes an adder which makes an arithmetic operation ΣtmpB and outputs the result of D. Reference numeral 1011 denotes an adder, which makes an arithmetic operation ΣtmpA×(tmpB/2$^2$). Reference numeral 1012 denotes an operational circuit which makes an arithmetic operation |ΣtmpA×(tmpB/2$^2$)| /2$^{2X+5}$, and outputs E and its sign S.

Figure 21:
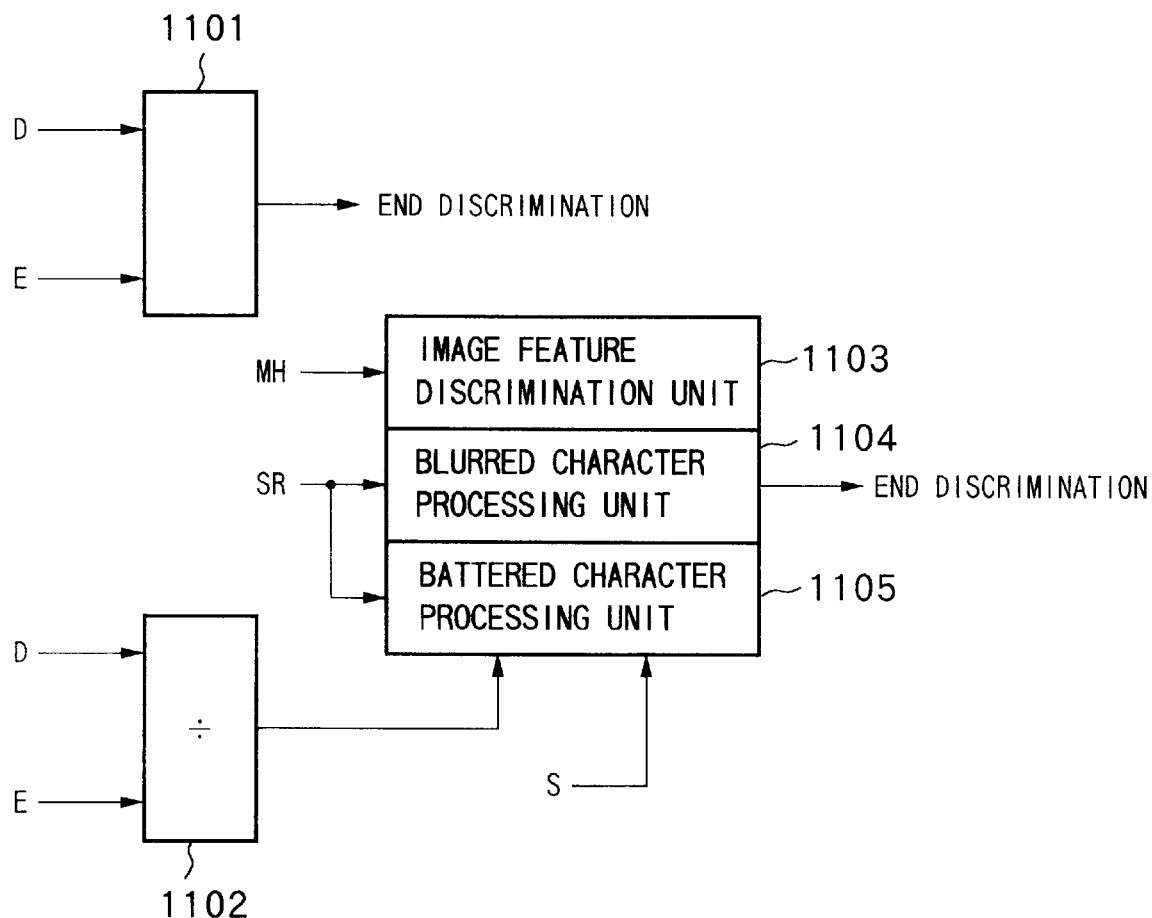
FIG. 21 is a block diagram showing the arrangement of a discrimination unit.

FIG. 21 is a block diagram showing in detail the discrimination unit 604 for discriminating the end condition of threshold value calculations.

Reference numeral 1101 denotes a comparator which discriminates based on the values D and E obtained by the skew operational unit 603 if E×8<D, i.e., |SK|<0.125. Reference numeral 1102 denotes a divider which calculates E/D using the values D and E to obtain the value SK'n, i.e., |sKn|. Reference numeral 1103 denotes an image feature discrimination unit; 1104, a blurred character processing unit; and 1105, a battered character processing unit. The units 1103, 1104, and 1005 hold MF, KF, TF, and SK1 in FIGS. 13 to 17, which are commonly managed.

Referring back to FIGS. 13 and 15, the image feature discrimination unit 1103 will be explained. In step S701, "0" is set in the character flag MF which indicates if the block being processed is a "character block" at the beginning of the operation. In step S704, the control waits for the end of the arithmetic operation of the first skew value. Upon calculating the first skew value (D1 and E1 in this process), the flow advances to step S706 to execute image feature discrimination. If the sing S of the skew value is negative (S728), the flow advances to step S729; otherwise, the flow jumps to step S718 to end image feature discrimination. In step S729, it is checked by relation (14) below using the skew value SK'1 calculated by the divider 1102 if the block being processed is a "character block":

$$SK'>MH \tag{14}$$

where MH is a value indicating whether or not the block being processed is a "character block", and this value is set in the control unit 208 by the CPU unit 7. In this case, "MH=20". If relation (14) holds in step S729, the flow advances to step S707; otherwise, the image feature discrimination processing ends. In step S707, "1" is set in the character flag MF which indicates that the block being processed is a "character block", and the skew value obtained in the next step S708 is held in SK1, thus ending this image feature discrimination processing.

The image feature discrimination processing of this embodiment is performed as described above. However, the present invention is not limited to the condition defined by equation (14) above.

Figure 17:
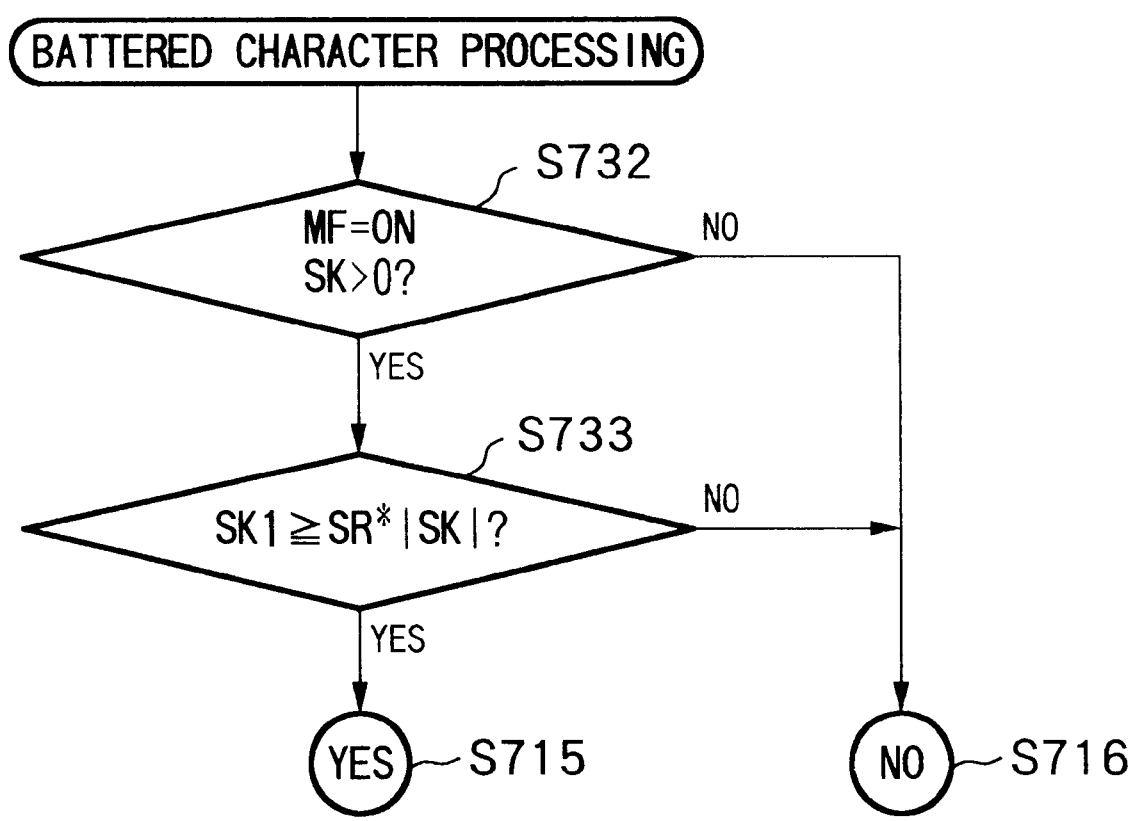
FIG. 17 is a flow chart showing the threshold value operation processing.

The battered character processing unit will be described in detail below using FIGS. 13 and 17 as well.

Note that a battered character is one which is battered since it has, e.g., a large number of strokes, and when a battered character is determined, a threshold value that can satisfactorily reproduce the character is assigned.

In step S701, "OFF" is set in the battered character flag TF which indicates whether or not the block being processed is a "battered character block". Upon completion of the second skew arithmetic operation (D2, E2), the flow advances to step S714. If the character flag MF is "ON" and the sign S is positive, it is checked in step S733 by relation (15) below using SK1 held in step S708 and the skew value SK'2 calculated by the divider 1102 if the block being processed is a "battered character block":

$$SK1>=SR \times SK'2 \tag{15}$$

where SR is a value which indicates if the block being processed is a "battered character block", and is set to be "SR=3.0" in this case. If relation (15) holds in step S733, the flow advances to step S715; otherwise, this battered character processing ends. In step S715, "ON" is set in the battered character flag TF indicating that the block being processed is a "battered character block", thus ending this battered character processing.

The battered character processing of this embodiment is performed as described above. However, the present invention is not limited to the condition defined by relation (15) above.

Figure 16:
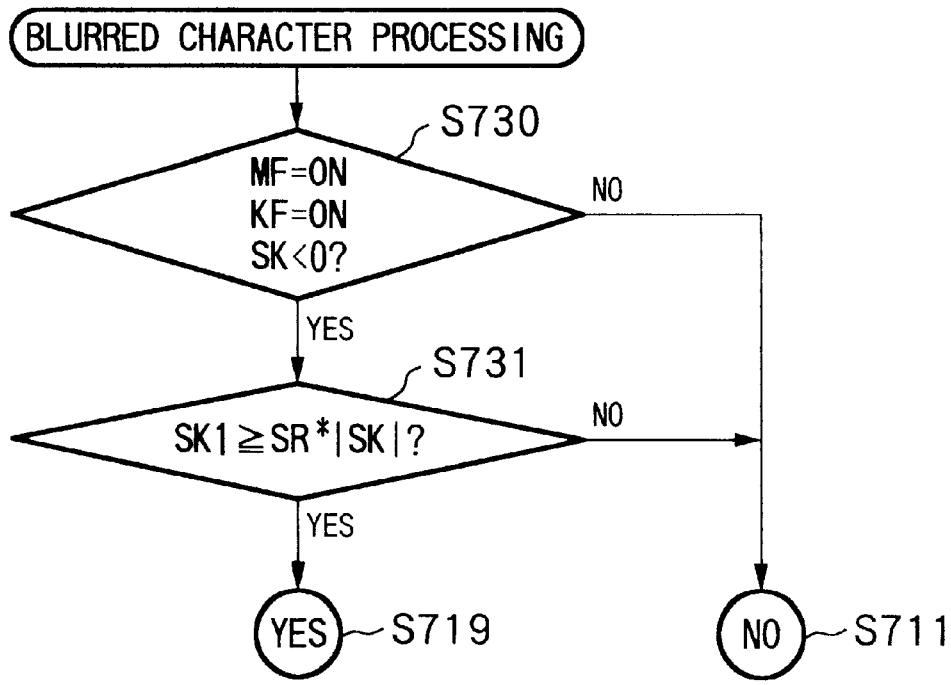
FIG. 16 is a flow chart showing the threshold value operation processing.

Furthermore, the blurred character processing will be described in detail below using FIGS. 13 and 16. Note that a blurred character is one which is blurred. In this embodiment, an optimal threshold value is assigned to this blurred character. In step S701, "OFF" is set in the blurred character flag KF indicating whether or not the block being processed is a "blurred character block". When the character flag MF is "ON" and the sign S is negative for the second subsequent skew value or subsequent skew values, it is checked in step S731 by relation (15) below using SKi held in step S708 and the skew value SK'n calculated by the divider 1102 if the block being processed is a "blurred character block". Note that SR is a value indicating if the block being processed is a "blurred character block", and is set to be "SR=3.0" in this case. If relation (15) holds in step S731, the flow advances to step S719. If relation (15) does not hold, the flow advances to step S711, and only when the loop count is 2, the flow advances to step S712. If it is determined in step S712 that the sign S is positive, "OFF" is set in the blurred character flag KF.

Note that SR is a value indicating if the block being processed is a "blurred character block", and is set to be "SR=3.0" in this case.

The blurred character processing of this embodiment is performed as described above. However, the present invention is not limited to the condition defined by relation (15) above.

Figure 13:
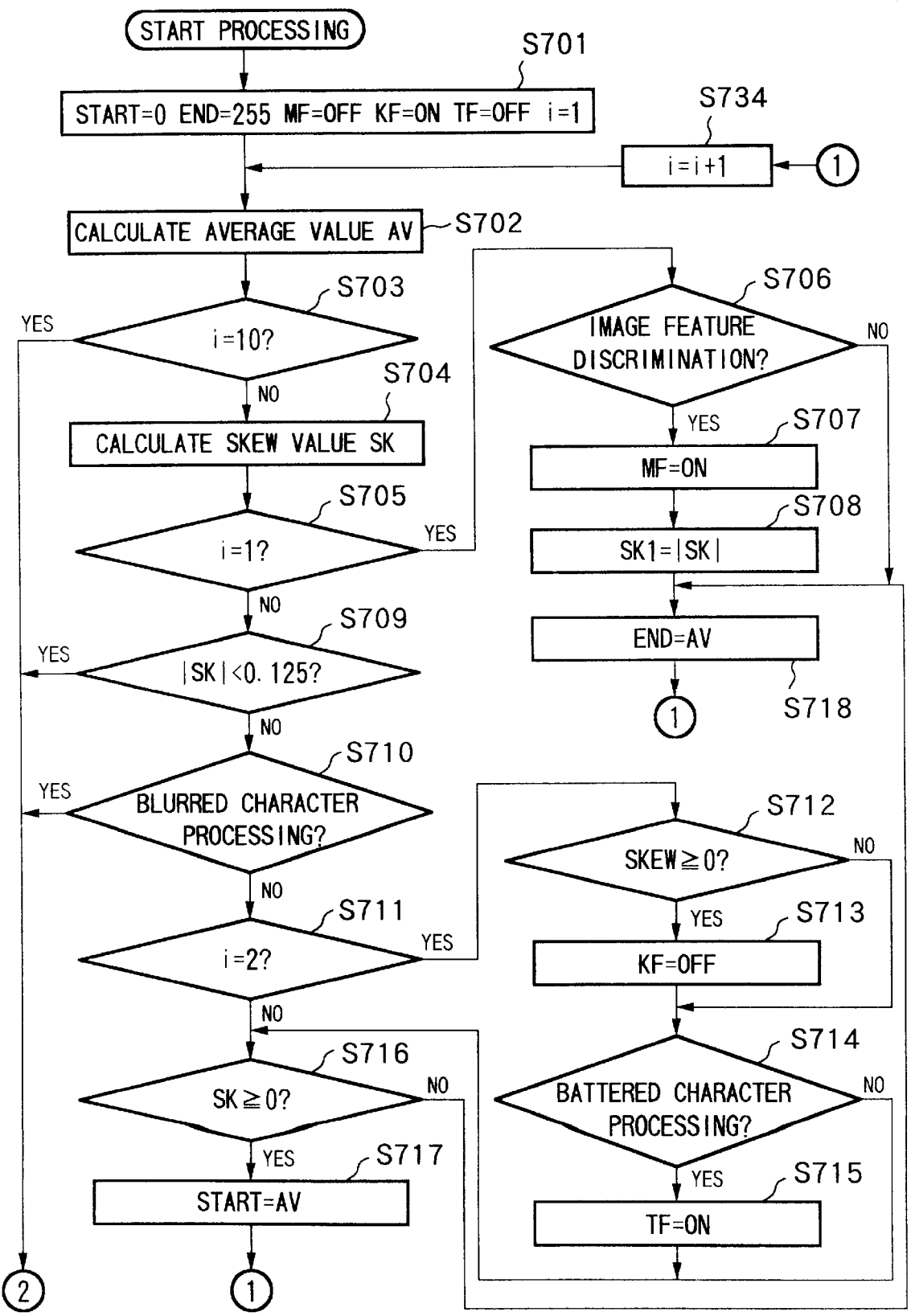
FIG. 13 is a flow chart showing the threshold value operation processing.
Figure 14:
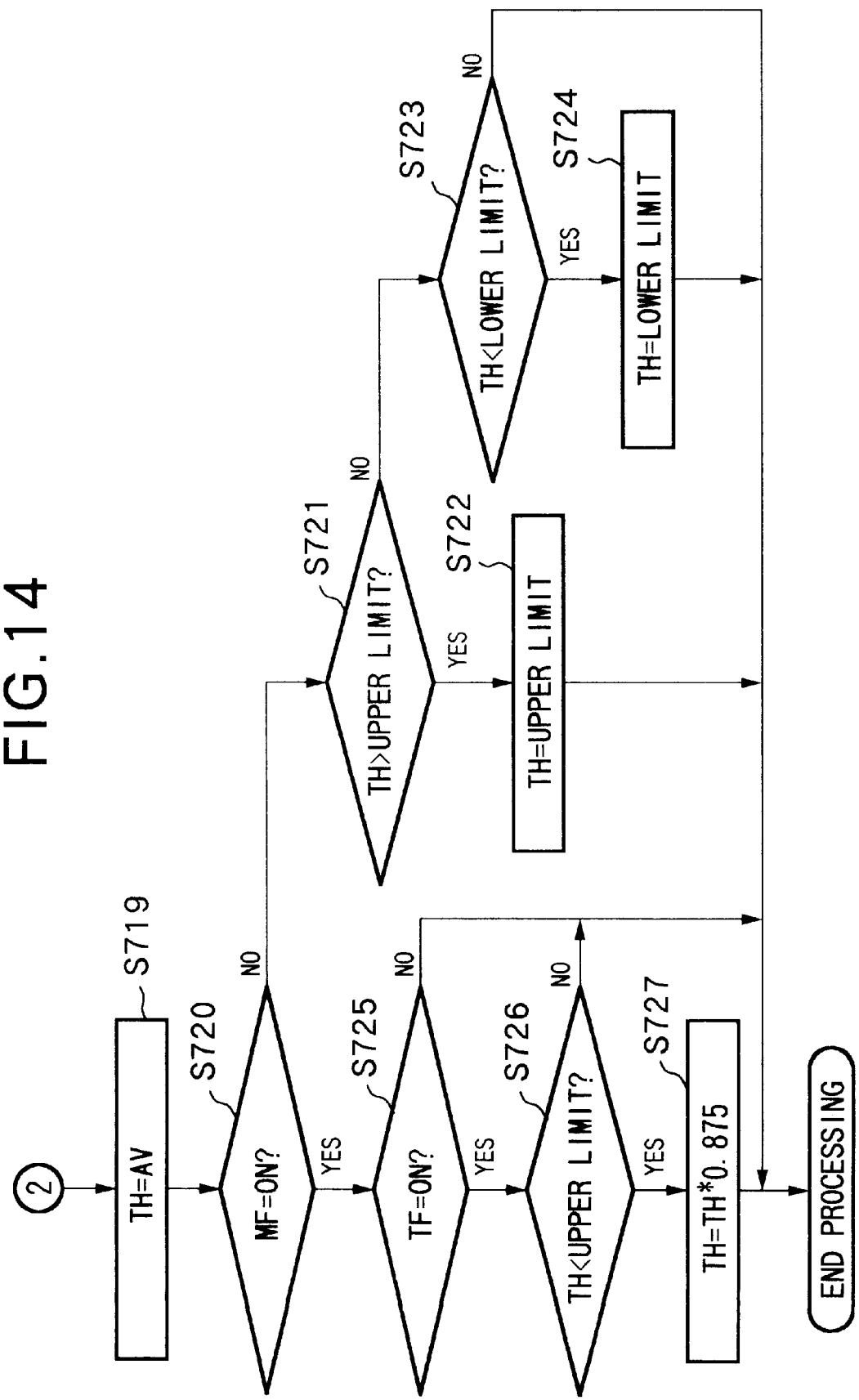
FIG. 14 is a flow chart showing the threshold value operation processing.
Figure 15:
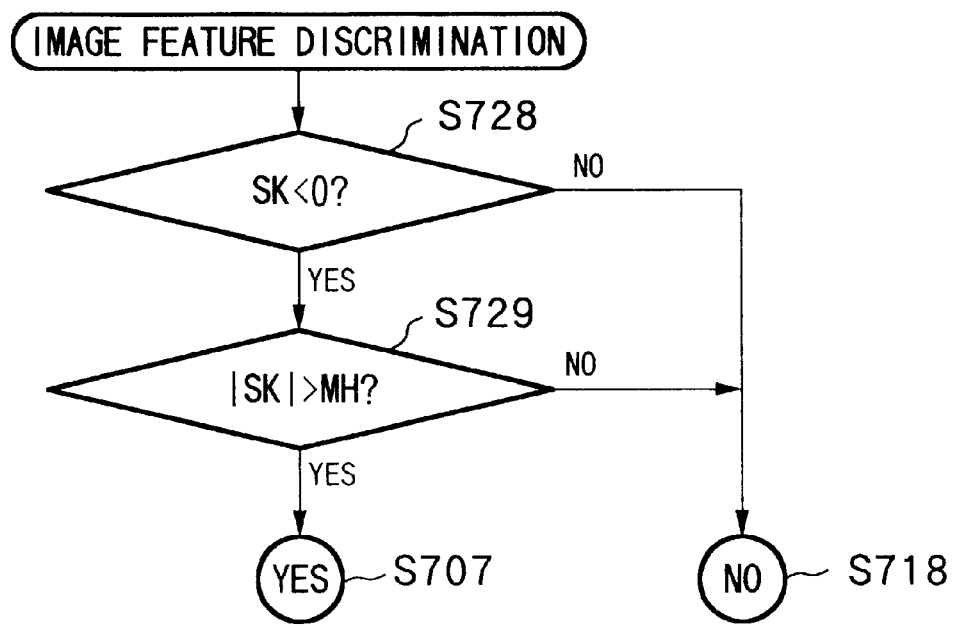
FIG. 15 is a flow chart showing the threshold value operation processing.

In the second loop in FIG. 13, although both the blurred character processing and the battered character processing fall on each other, steps S731 and S733 as a main body of each processing execute the same processing, and as can be seen from steps S730 and S732, one of these processing operations to be executed is determined depending on the sign of the second skew value. Accordingly, since the two processing operations are exclusively executed and have the same processing contents, they have little influence on the circuit scale and execution time.

When the end discrimination has been made, the discrimination unit 604 outputs the average value AV to the threshold value limiting unit 606, and the threshold value limiting unit 606 sets the average value AV at that time as the threshold value TH. Then, the flow advances to step S720. When the block being processed is not a character block, i.e., the character flag MF is "OFF", the threshold value TH is limited using upper-and lower-limit values H and L. More specifically, if the threshold value TH determined in step S719 is smaller than the lower-limit value L, the threshold value TH is represented by L; if the threshold value TH is larger than the upper-limit value H, the threshold value TH is represented by H, thus attaining the limitation processing. Note that the upper- and lower-limit values H and L are determined by the characteristics of the image input apparatus 2. If the block being processed is a character block, the flow advances to step S725 to check if the battered character flag TF is "ON" (to check if the block being processed is a battered character block). If it is determined as a result of checking that the block being processed is a battered character block, the flow advances to step S726. If it is determined in step S726 that the threshold value TH is smaller than the upper-limit value H, the flow advances to step S727 to perform limitation processing for multiplying the threshold value TH by a constant TP to prevent the character from being battered. Note that the constant TP is set to be 0.875, but is a value determined by the characteristics of the image input apparatus 2.

Figure 22:
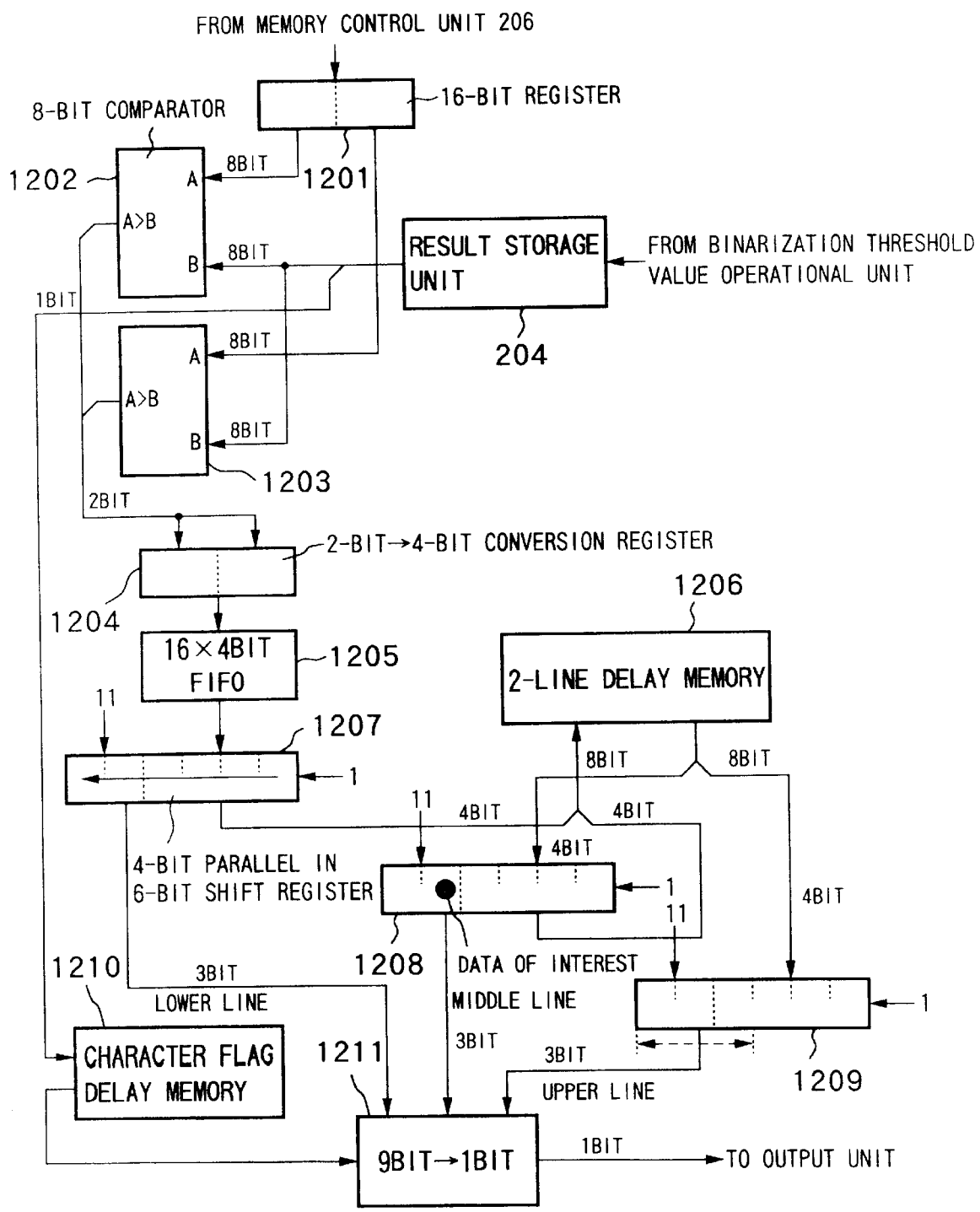
FIG. 22 is a block diagram showing the arrangement of a result storage unit and an image conversion processing unit.

FIG. 22 is a block diagram showing in detail the result storage unit 204 and the image conversion processing unit 203 shown in FIG. 2.

The result storage unit 204 receives the threshold values of the respective blocks determined by the binarization threshold value operational unit 205 and character flags MF each indicating if the block of interest is a character block, and stores them therein. The unit 204 receives the threshold values at time intervals corresponding to 4,096 pixels (=64×64) from the binarization threshold value operational unit 205. The internal memory capacity is 128×2×9 bits (8,192÷64=128) if the maximum number of pixels per line of an image to be processed is 8,192 pixels. Since the memory control unit 206 line-sequentially outputs images to be binarized, the output time interval from the result storage unit 204 to the image conversion unit 203 (i.e., from a circuit 1201 to a circuit 1211 to be described later) corresponds to 64 pixels, in which input/output contentions are arbitrated. The image conversion processing unit 203 includes circuits 1201 to 1211. Reference numeral 1201 denotes a 16-bit register which temporarily stores data for two pixels read out by the memory control unit 206. Reference numerals 1202 and 1203 denote comparators, which concurrently compare the two pixel data with a threshold value, and output the comparison results. Reference numeral 1204 denotes a 2-bit→4-bit conversion register; and 1205, a FIFO memory having a 4-bit width. The register 1204 receives binary data (2 bits) for two pixels from the comparators 1202 and 1203 twice, and outputs them to the FIFO memory 1205 after it receives 4 bits. The circuits 1201 to 1204 operate in synchronism with internal operation clocks, and the circuits 1206 to 12111 operate in synchronism with image input/output clocks. The FIFO memory 1205 absorbs the difference between these clock rates. Reference numeral 126 denotes a memory which delays a binary image by two lines, and has a capacity of 2k×8 bits. Since the memory 1206 has a function equivalent to that of an 8k×2-bit FIFO memory but has an 8-bit bus width four times that of such FIFO memory, processing is attained by a 1-port RAM. The memory 1206 is accessed once per two image clocks. Reference numerals 1207, 1208, and 1209 denote shift registers, which generate a 3 pixel×3 pixel window. Reference numeral 1210 denotes a character flag delay memory, which has a capacity of (128+α) bits. Reference numeral 1211 denotes an isolated point removal unit, which checks the pixel of interest in the shift register 1208, i.e., pixels around the central pixel of 3×3 pixels. If an isolated point is found, the unit 1211 converts it into a white pixel "1" and outputs the converted pixel. The output from the delay memory 1210 to the isolated point removal unit 1211 is the value of the character flag MF of the block that includes the pixel of interest, and if the character flag is "1", isolated point removal is enabled; if the flag is "0", isolated point removal is disabled to through-output the pixel of interest.

Note that a portion falling outside the 64×64 processing block uses a binarization threshold value of its neighboring 64×64 block.

In the above-mentioned embodiment, the block size is set to be 64×64. However, if the image resolution is doubled, a 128×128 block size is used; if the resolution is halved, a 32×32 block size is used. Even when the block size becomes smaller, the arithmetic operation precision can be assured by Y in equations (7) to (13) using the same hardware arrangement. When the block size is to be increased, the bit width (capacity) of each luminance frequency RAM is increased, and the number of bits of the operational circuits in the average value operational and the skew operational unit for calculating the threshold value is also increased. That is, an arithmetic operation system is designed depending on the maximum value of the resolution of an image to be processed.

However, if a sufficient number of samples (the number of pixels that define luminance frequencies) is required, processing may be attained by thinning out data. For example, processing may be sufficiently attained by 4,096 pixels. In this case, the arrangement of the threshold value operational unit remains the same. Even when the bit width of each luminance frequency RAM is increased by 2 bits, and data read out from the luminance frequency RAM is input to the average value operational and the skew operational unit for calculating the threshold value while excluding lower 2 bits, the arrangement of the threshold value operational unit is left unchanged.

The required number of samples is determined by, e.g., the characteristics of the image input apparatus.

The above embodiment uses a square block but may use a rectangular block.

In the above embodiment, isolated point removal is performed for only a block which is determined to be a character block. However, isolated point removal may or may not be performed for all the blocks.

When the operation frequency has a sufficient margin, each luminance frequency RAM may be constituted by a 1-port RAM. Since a series of operations, i.e., reading of memory data, +1 addition, and writing of memory data corresponding to each luminance value are to be performed, the number of processing clocks increases to about three times, but the circuit for monitoring mismatching of pipeline processing can be omitted.

Also, the circuit for storing the luminance frequencies may be constituted by a counter. Although the circuit scale increases, the operation frequency can be increased since one pixel can be processed by one clock.

As described above, according to this embodiment, since band memories required in units of processing operations can be combined to one block, only a set of memory control signals are required, and the number of signals can be decreased, thus facilitating the manufacture of ICs. Since the respective processing buffers are not physically separated, the processing start timings can be freely set.

When each luminance frequency memory is constituted by a multi-port RAM, the frequency required for totaling the luminance frequencies can be reduced, and a higher-speed operation can be assured.

Since the average value operational unit and the skew operational unit for calculating the binarization threshold value attain pipeline processing by synchronously performing their arithmetic operations, the number of luminance frequency RAMs which must be sequentially executed or are individually required for the average value operational unit and the skew operation unit can be reduced to one. Hence, high-speed processing and prevention of an increase in circuit scale can be realized at the same time.

Since isolated points in character and line image portions of an image are removed, the image becomes easy to see, and the recognition rate of character recognition can be improved. Since the compression efficiency can also be improved, the image storage space can be decreased, and the transfer rate of, e.g., FAX can be improved.

According to this embodiment, the decimal point position of arithmetic operations is determined based on the value that the operand may assume, which value is predicted using the operational formulas of the arithmetic operations and numerical data used in the arithmetic operations, and some digits of the operand are dropped or the mantissa of the operand is shifted to the left, so that the final operation result can fall within the range of the predetermined number of effective digits.

Furthermore, the decimal point position of the arithmetic operations is determined for each processing unit.

Moreover, the determination processing unit has determination means which has as its processing unit a unit for calculating the average value of the luminance frequencies of the image and calculating the offset of the luminance frequencies of the image.

For example, the number of effective digits is determined by the required precision of the operand.

With the above-mentioned arrangement, a unique effect can be obtained, i.e., a predetermined precision can be maintained within the limited range of integer effective numbers that can be processed by a computer, and high-speed repetitive arithmetic operations can be attained while allowing convergence of large numbers as well as small numbers.

More specifically, all the calculations are divided into a plurality of processing units, and the data range is checked for each arithmetic operation processing unit to determine the number of digits with which the required arithmetic operation precision can be obtained. The decimal point position of an integer operation is shifted based on the determined number of digits, and arithmetic operations are made. With this processing, since integer operations are performed within each processing range, the hardware amount can be reduced in the case of hardware arithmetic operations. In addition, since an optimal decimal point position is determined for each processing unit, the precision can be improved while decreasing the number of digits.

<Second Embodiment>

Figure 23:
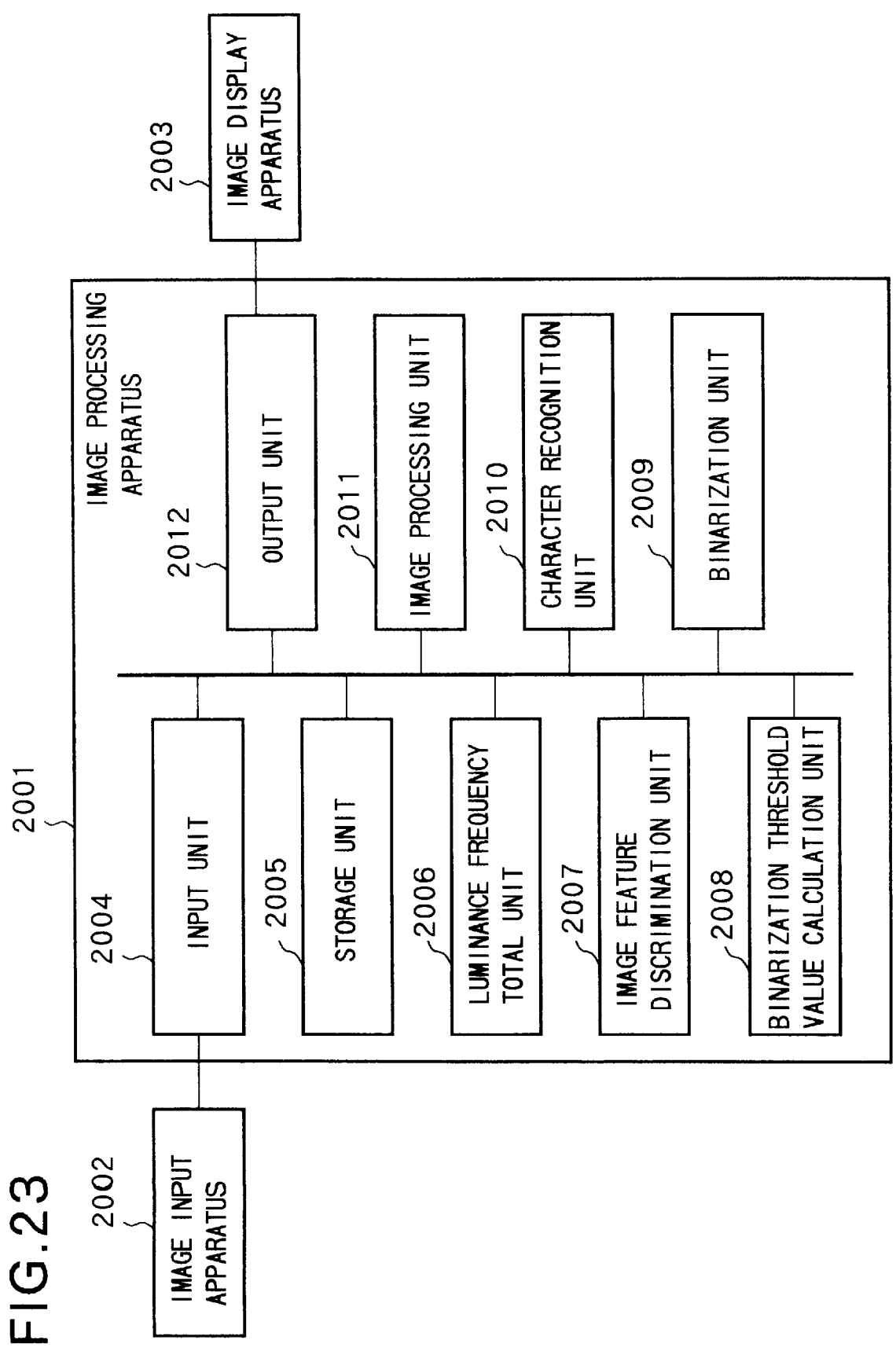
FIG. 23 is a block diagram showing the arrangement of an image processing system according to the second embodiment of the present invention.

FIG. 23 is a block diagram showing the arrangement of an image processing system for executing binarization processing in this embodiment. Referring to FIG. 23, reference numeral 2001 denotes an image processing apparatus for performing binarization processing, character recognition processing, and the like of an image. Reference numeral 2002 denotes an image input apparatus such as a scanner for inputting an image. Reference numeral 2003 denotes an image display apparatus for displaying the processed image.

In the image processing apparatus 2001, reference numeral 2004 denotes an input unit serving as an interface with the image input apparatus 2002. Reference numeral 2005 denotes a storage unit such as a memory for storing data in processing. Reference numeral 2006 denotes a luminance frequency total unit for summing up the luminance frequencies (histogram) of an input image. Reference numeral 2007 denotes an image feature discrimination unit for discriminating if the input image is a character image. Reference numeral 2008 denotes a binarization threshold value calculation unit for calculating the binarization threshold values in units of input images. Reference numeral 2009 denotes a binarization unit for producing a binary image using the threshold values calculated by the binarization threshold value calculation unit 2008. Reference numeral 2010 denotes a character recognition unit for performing character recognition processing for a region extracted as a character region. Reference numeral 2011 denotes an image processing unit for performing various kinds of image processing for a region separated as a region other than the character region, and image layout processing. Reference numeral 2012 denotes an output unit serving as an interface with the image output apparatus 2003. These units are systematically controlled by a CPU (not shown).

OCR processing executed in the image processing apparatus 2001 of this embodiment with the above arrangement will be described below.

Figure 24:
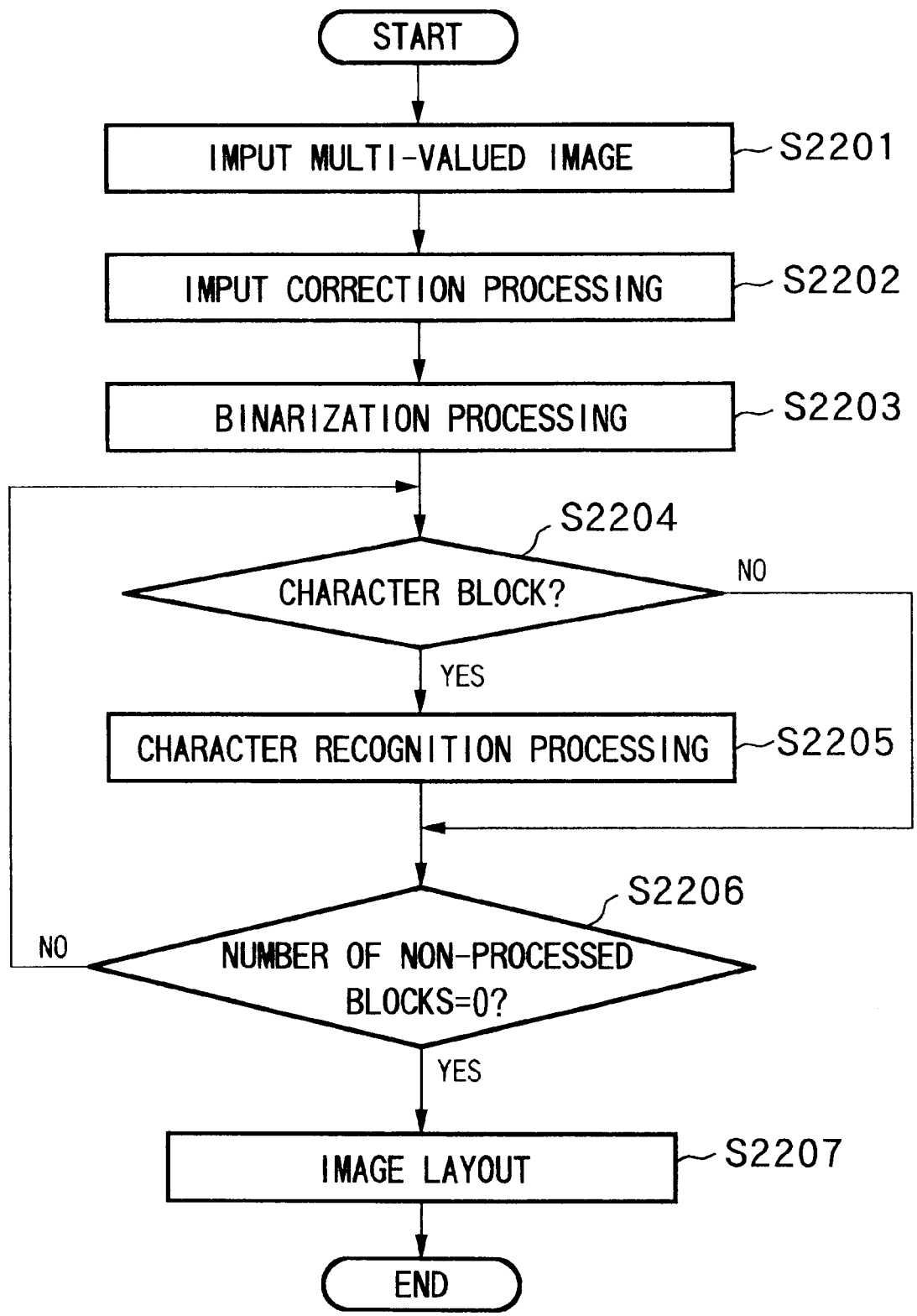
FIG. 24 is a flow chart showing the character recognition processing in the second embodiment.

FIG. 24 is a flow chart showing the character recognition processing using a binarization threshold value determination method as a characteristic feature of this embodiment. In step S2201, image data is input by the image input apparatus 2002 such as a scanner. In this case, image data is input as 8-bit multi-valued image data. In step S2202, the input image is subjected to correction such as removal of electrical noise of the image input apparatus 2002 generated upon inputting image data, and correction for deterioration of the original image, any skew of the original, and the like. Subsequently, in step S2203, a character block (a battered character block or blurred character block) is discriminated as a characteristic feature of this embodiment with respect to the multi-valued image input in step S2201, optimal binarization threshold values are set for the discriminated character blocks, and a binary image is produced based on the determined binarization threshold values. Note that the binarization processing will be described in detail later.

Thereafter, the flow advances to step S2204 to check if the binary image binarized in step S2203 corresponds to a block determined as a character block. If a character block is determined, the flow advances to step S2205, and the character block is extracted from the binary image and is subjected to character recognition processing. Then, recognized character codes are output. In step S2206, it is checked if non-processed blocks remain in the image. If a non-processed block remains, the flow returns to step S2204; otherwise, the flow advances to step S2207. In step S2207, character blocks and non-character blocks are synthesized in the same layout as that of the original image.

[Binarization Processing]

Figure 25:
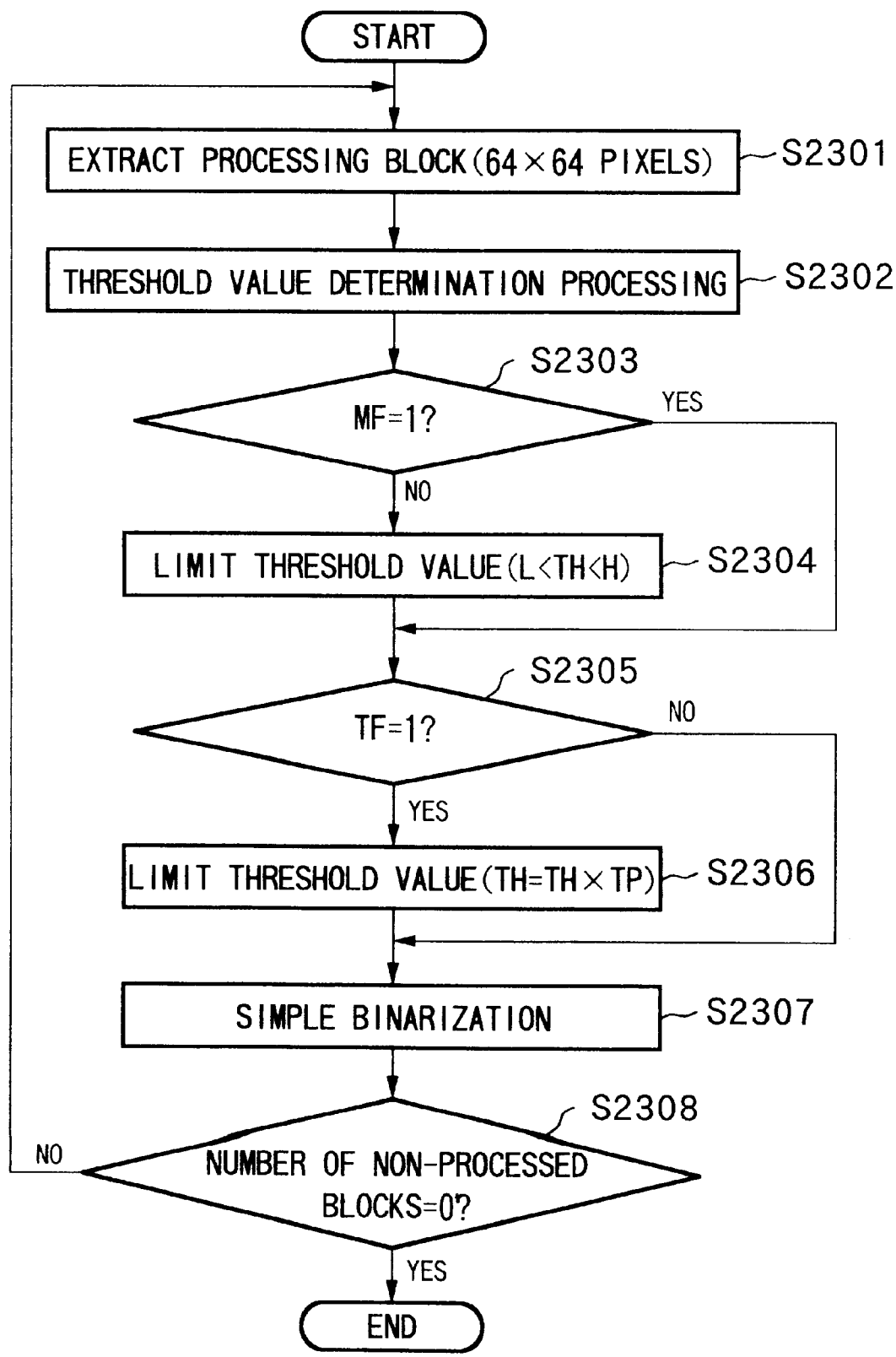
FIG. 25 is a flow chart showing the binarization processing in the second embodiment.

The binarization processing in step S2203 above will be described in detail below with reference to the flow chart in FIG. 25.

In step S2301, an 8-bit multi-valued image is input from the storage unit 2005 in the image processing apparatus 2001 to a memory or the like (not shown) in units of processing blocks (64×64 pixels in this embodiment). Note that the multi-valued image is stored in advance in the storage unit 2005 by the image input apparatus 2002 such as a scanner. In step S2302, a character block (a battered character block or blurred character block) is discriminated, and the threshold value for binarization is determined in units of processing blocks (64×64 pixels) of the input image. It is checked in step S2303 if a character flag MF (to be described in detail later) is "1". If YES in step S2303, the flow jumps to step S2305; otherwise, the flow advances to step S2304. In step S2304, a threshold value TH is limited by upper- and lower-limit values L and H. More specifically, limitation processing is performed, i.e., when the threshold value TH determined in step S2302 is smaller than the lower-limit value L, the threshold value TH is represented by L; when the threshold value TH is larger than the upper-limit value H, the threshold value TH is represented by H. Note that these upper- and lower-limit values H and L are determined by the characteristics of the image input apparatus 2002.

It is then checked in step S2305 if a battered character flag TF (to be described later) is "1". Note that checking if the block being processed is a battered character block will be described later. If YES in step S2305, the flow advances to step S2306; otherwise, the flow jumps to step S2307 to limit the threshold value TH. More specifically, limitation processing for multiplying the threshold value TH determined in step S2302 or S2304 by a constant TP for preventing a battered character is performed. Note that the constant TP is a value determined by the characteristics of the image input apparatus 2002. In step S2307, simple binarization processing is performed using the threshold values TH determined in steps S2302, S2304, and S2306. In step S2308, it is checked if the current block is the last processing block (64×64 pixels) of the input image. If YES in step S2308, the binarization processing ends;

otherwise, the flow returns to step S2301. [Threshold Value Determination Processing]

Figure 26:
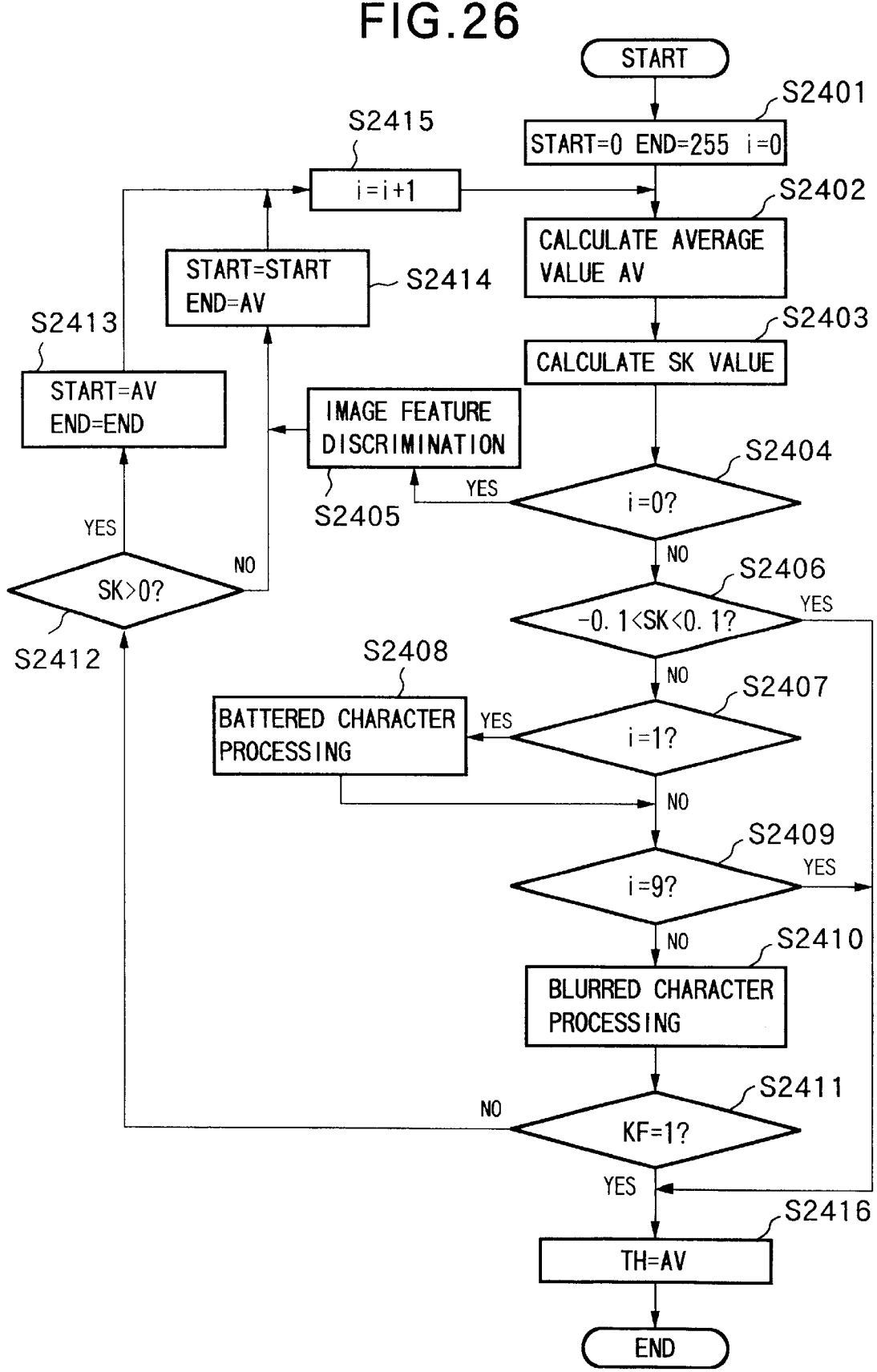
FIG. 26 is a flow chart showing the threshold value determination processing in the second embodiment.

The binarization threshold value determination processing in step S2302 above will be described in detail below with reference to the flow chart in FIG. 26.

In step S2401, "0" and "255" are respectively set in parameters START and END. The parameters START and END respectively correspond to the start and end points of the statistical quantity of the luminance value calculated in step S2402 or S2403 later. Also, "0" is set in a threshold value determination processing loop count i to initialize it. In step S2401, at the same time, the frequencies (histogram) for 8 bits, i.e., digital values ranging from "0" to "255" are calculated using all the pixels in one processing block (64×64 pixels).

In step S2402, an average value AV of pixels corresponding to the digital values ranging from START to END is calculated. For example, if START=0 and END=255, the average value AV of pixels having values from "0" to "255" is calculated; if START=0 and END=109, the average value AV of pixels having values from "0" to "109" is calculated. In step S2403, a skew value SK of pixels corresponding to the luminance values ranging from START to END is calculated. Note that the skew value is a statistical quantity representing the skew of the histogram distribution. The skew value is calculated using the following equation (16):

$$SK = (\Sigma(Xi-AV)^3)/D \qquad (16)$$

where Xi is the luminance value of each pixel, and $x^y$ represents the y-th power of x. D is the variance of the entire image and is calculated by:

$$D = \Sigma(Xi-AV)^2 \qquad (17)$$

In equation (16) above, the skew value is calculated by cubing the difference between the luminance value of each pixel and the average value, but the present invention is not limited to cubing as long as the exponent is an odd value.

In step S2404, the threshold value determination processing loop count i in one block is checked (to check if i=0, i.e., the current loop corresponds to the first loop). If i="0", the flow advances to step S2405; otherwise, the flow advances to step S2406. In step S2405, image feature discrimination (to be described in detail later) for checking if the block being processed is a "character block" is performed, and thereafter, the flow advances to step S2414.

In step S2406, the magnitude of the skew of the histogram is checked using the following relations (18):

$$-0.1 < SK \text{ and } SK < 0.1 \qquad (18)$$

More specifically, it is checked if the absolute value of the skew value SK is less than "0.1". If YES in step S2406, the flow jumps to step S2416; otherwise, the flow advances to step S2407 to check the threshold value determination processing loop count i. If i="1", the flow advances to step S2408; otherwise, the flow advances to step S2409. In step S2408, discrimination (for checking if the block being processed is a "battered character block") and processing are performed (to be described in detail later). In step S2409, the threshold value determination processing loop count i is checked. If i="9", the flow jumps to step S2416; otherwise, the flow advances to step S2410. In step S2410, discrimination (for checking if the block being processed is a "blurred character block") and processing are performed (to be described in detail later). It is then checked in step S2411 if a blurred character flag KF is "1". If YES in step S2411, the flow advances to step S2416; otherwise, the flow advances to step S2412.

In step S2412, the skew direction of the histogram is determined using the following relation (19):

$$SK > 0 \qquad (19)$$

If relation (19) holds in step S2412 (this means that the skew of the histogram falls within the value range larger than the average value AV), the flow advances to step S2413; if relation (19) does not hold (this means that the skew of the histogram falls within the value range smaller than the average value AV), the flow advances to step S2414. In step S2413, the average value AV is set in START, and END is left unchanged. On the other hand, in step S2414, START is left unchanged, and the average value AV is set in END. In step S2415, the threshold value determination processing loop count i is incremented by "1", and the flow returns to step S2402 to calculate the average value AV of values ranging from START to END again.

Finally, in step S2416, the average value AV is set as the binarization threshold value TH, thus ending this threshold value determination processing.

The binarization processing of this embodiment is performed as described above. However, the present invention is not limited to the ranges defined by relations (18) and (19). [Image Feature Discrimination Processing]

Figure 27:
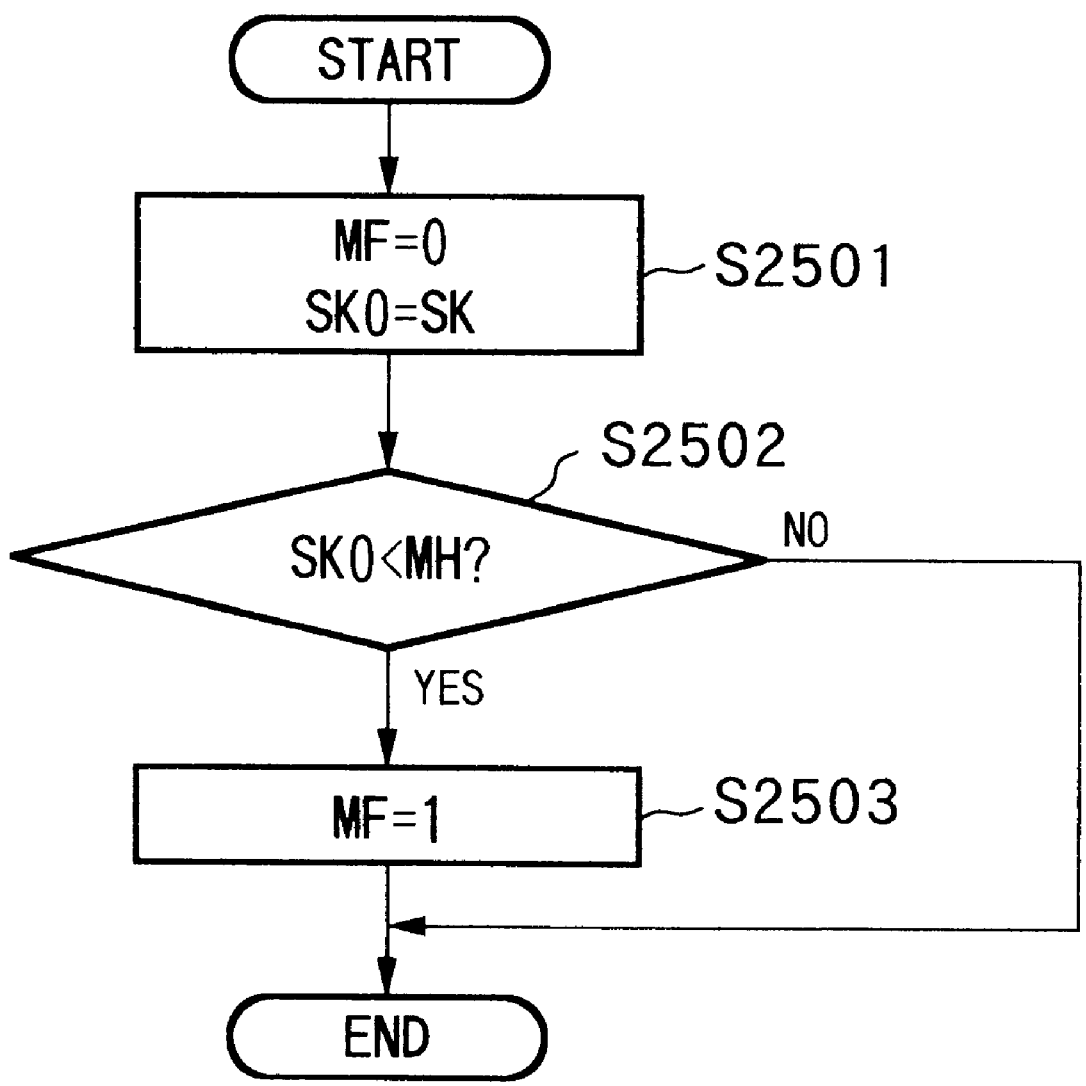
FIG. 27 is a flow chart showing the image feature discrimination processing in the second embodiment.

The image feature discrimination processing in step S2405 above will be described in detail below with reference to FIG. 27.

In step S2501, "0" is set in the character flag MF indicating whether or not the block being processed is a "character block". Also, the skew value SK is set in SK0 indicating the initial skew value in the threshold value determination processing loop (this is because the image feature discrimination processing is performed in only the first loop of the threshold value determination processing loops). In step S2502, it is checked using relation (20) below if the block being processed is a "character block":

$$SK0 < MH \qquad (20)$$

where MH is the value indicating whether or not the block being processed is a "character block", and is set to be "MH=-20.0" in this case. If relation (20) holds in step S2502, the flow advances to step S2503; otherwise, this image feature discrimination processing ends. In step S2503, "1" is set in a character flag MH indicating that the block being processed is a "character block", thus ending the image feature discrimination processing.

As described above, the image feature discrimination processing of this embodiment is performed. However, the present invention is not limited to the condition defined by relation (20).

[Battered Character Processing]

Figure 28:
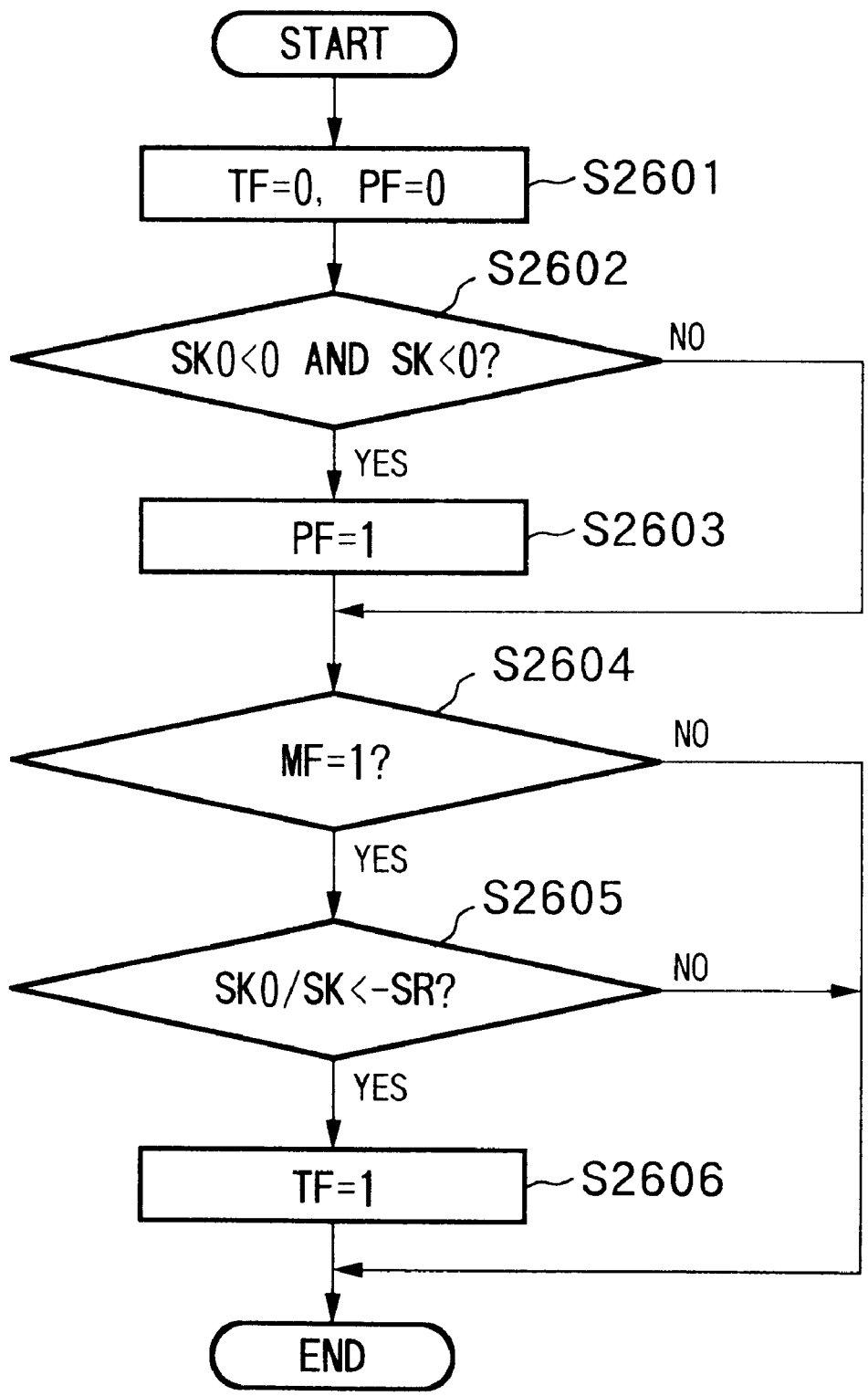
FIG. 28 is a flow chart showing the battered character processing in the second embodiment.

The battered character processing in step S2408 above will be described in detail below with reference to FIG. 28. In step S2601, "0" is set in a battered character flag TH indicating whether or not the block being processed is a "battered character block". Also, "0" is set in a flag PF indicating that the skew of the histogram of the block being processed is large. In step S2602, it is checked if both the skew value SK0 in the first loop of the threshold value determination processing loop and the skew value SK in the loop in processing are negative values. If YES in step S2602, "1" is set in the flag PF in step S2603. It is checked in step S2604 if the character flag MF is "1" (i.e., to check if the block being processed is a character block). If YES in step S2604, the flow advances to step S2605; otherwise, this battered character processing ends. In step S2605, it is checked using relation (21) below if the block being processed is a "battered character block":

$$SK0/SK<-SR \qquad (21)$$

where -SR is the value indicating whether or not the block being processed is a "battered character block", and is set to be "-SR=-3.0" in this embodiment. If relation (21) holds in step S2605, the flow advances to step S2606; otherwise, this battered character processing ends. In step S2606, "1" is set in the battered character flag TF indicating that the block being processed is a "battered character block", thus ending this battered character processing.

As described above, the battered character processing of this embodiment is performed. However, the present invention is not limited to the condition defined by relation (21).

[Blurred Character Processing]

Figure 29:
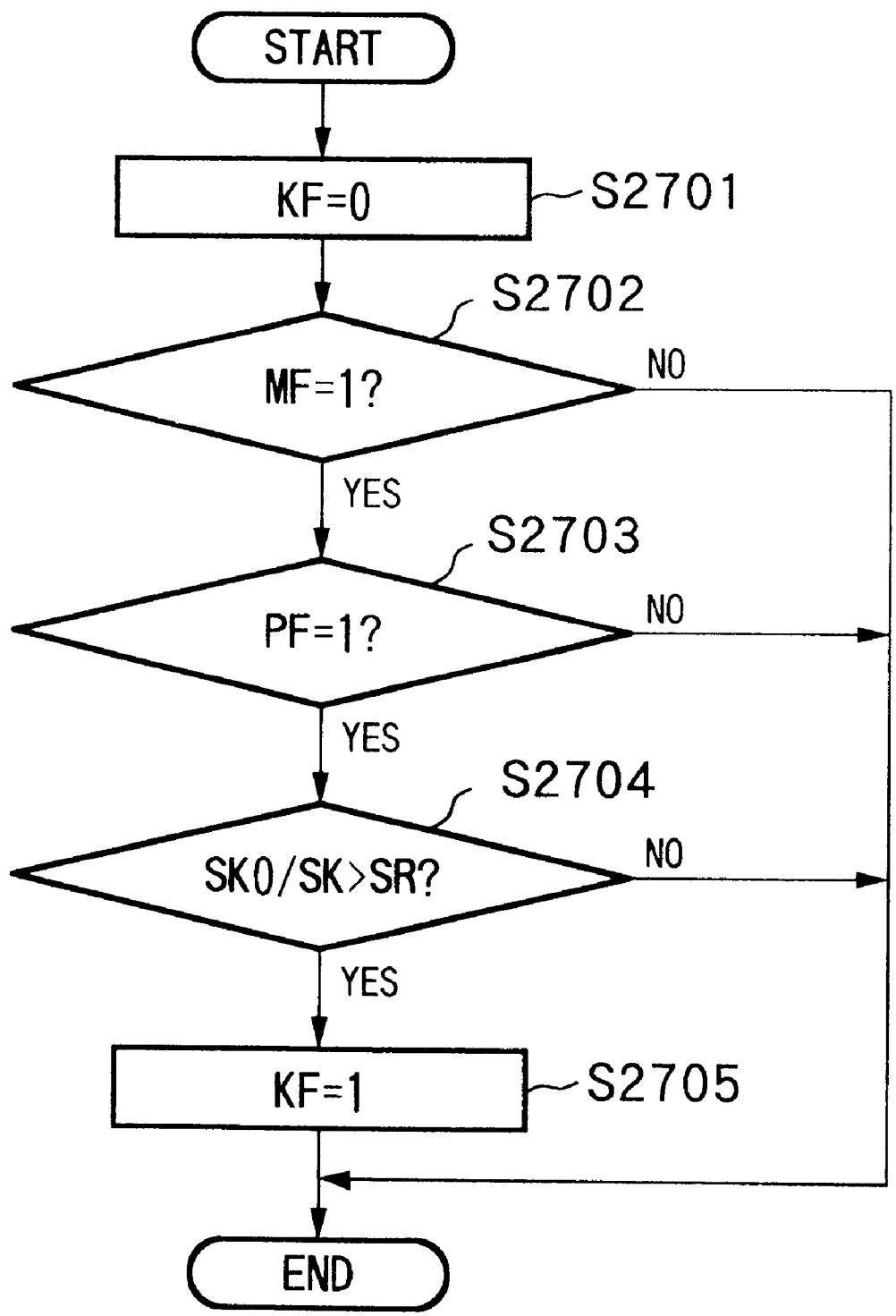
FIG. 29 is a flow chart showing the blurred character processing in the second embodiment.

The blurred character processing in step S2410 above will be described in detail below with reference to FIG. 29. In step S2701, "0" is set in a blurred character flag KF indicating whether or not the block being processed is a "blurred character block". In step S2702, it is checked if the character flag MF is "1" (to check if the block being processed is a character block). If YES in step S2702, the flow advances to step S2703; otherwise, this blurred character processing ends. In step S2703, it is checked if the flag PF indicating that the skew of the histogram of the block being processed is large is "1". If YES in step S2703, the flow advances to step S2704; otherwise, this blurred character processing ends. It is checked in step S2704 using relation (22) below if the block being processed is a "blurred character block":

$$SK0/SK>SR \qquad (22)$$

where SR is the value indicating whether or not the block being processed is a "blurred character block", and is set to be "SR=3.0" in this embodiment. If relation (22) holds in step S2704, the flow advances to step S2705; otherwise, this blurred character processing ends. In step S2705, "1" is set in the blurred character flag KF indicating that the block being processed is a "blurred character block", thus ending this blurred character processing.

As described above, the blurred character processing in this embodiment is performed. However, the present invention is not limited to the condition defined by relation (22).

The threshold value determination processing of this embodiment will be described in more detail below with reference to examples of images.

The determination processing of the binarization threshold value TH (FIG. 26) in this embodiment will be described below using an example of the histogram shown in FIG. 30.

Figures 30, 31:
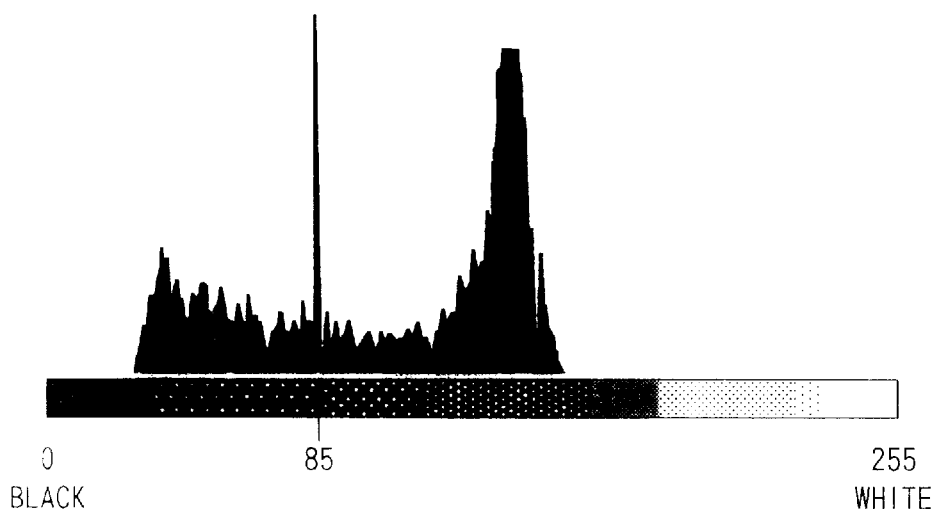
FIG. 30 illustrates an example of the histogram of a battered character image in the second embodiment.
FIG. 31 is a table showing changes in variables in the binarization processing of a battered character image in the second embodiment.

FIG. 30 shows the histogram of a battered character image (8-bit input). In FIG. 30, the abscissa plots digital values of luminance levels (the left end="0", i.e., black; the right end="255", i.e., white), and the ordinate plots the frequencies of the digital values. FIG. 31 shows changes in parameter values when the processing in steps S2402 and S2403 in the above-mentioned binarization processing shown in FIG. 26 is performed for an image having the histogram shown in FIG. 30. Note that FIG. 31 shows the parameter values in correspondence with the number of loops of steps S2402 and S2403.

In the first loop of processing in steps S2402 and S2403 (the threshold value determination processing loop count i=0), the average value AV and the statistical quantity SK are calculated using START=0 and END=255 to respectively yield values "109" and "-27.4". Since i=0, the flow advances from step S2404 to step S2405. In the image feature discrimination processing in step S2405, relation (20) holds since the statistical quantity SK is less than "-20.0", and "1" is set in the character flag MF. In step S2414, START=0 and END=109 are set.

In the second loop of processing (i=1), the average value AV and the statistical quantity SK are calculated using START=0 and END=109 to respectively yield values "62" and "8.9". Since the statistical quantity SK exceeds "0.1", the flow advances from step S2406 to step S2407, and since i=1, the flow advances to step S2408. In step S2408, since the skew value SK is a positive value, the flag PF remains "0". Since relation (21) holds since "-3.08 (=-27.4/8.9)", "1" is set in the battered character flag TF. In step S2410, since the flag PF remains "0", the flag KF also remains "0". Furthermore, since the skew value SK is a positive value, START=62 and END=109 are set in step S2413.

In the third loop of processing (i=2), the average value AV and the statistical quantity SK are calculated using START=62 and END=109 to respectively yield values "84" and "1.9". In this case, since the statistical quantity SK exceeds "0.1", the flow proceeds with steps S2407 and S2409 in turn. Since the skew value SK is a positive value, START=84 and END=109 are set in step S2413.

Subsequently, in the fourth loop of processing (i=3), the average value AV and the statistical quantity SK are calculated using START=84 and END=109 to respectively yield values "96" and "0.6". In this case, since the statistical quantity SK exceeds "0.1", the processing continues up to steps S2407 and S2409. Also, since the skew value SK is a positive value, START=96 and END=109 are set in step S2413.

In the fifth loop of processing (i=4), the average value AV and the statistical quantity SK are calculated using START=96 and END=109 to respectively yield values "102" and "-0.3". In this case, since the statistical quantity SK is less than "-0.1", the processing continues to steps S2407 and S2409 in turn. Also, since the skew value SK is a negative value, START=96 and END=102 are set in step S2414.

In the sixth loop of processing (i=5), the average value AV and the statistical quantity SK are calculated using START=96 and END=102 to respectively yield values "98" and "0.3". In this case, since the statistical quantity SK exceeds "0.1", the processing continues to steps S2407 and S2409 in turn. Also, since the skew value SK is a positive value, START=98 and END=102 are set in step S2413.

In the seventh loop of processing (i=6), the average value AV and the statistical quantity SK are calculated using START=98 and END=102 to respectively yield values "99" and "0.4". In this case, since the statistical quantity SK exceeds "0.1", the processing continues to steps S2407 and S2409 in turn. Also, since the skew value SK is a positive value, START=99 and END=102 are set in step S2413.

In the eighth loop of processing (i=7), the average value AV and the statistical quantity SK are calculated using START=99 and END=102 to respectively yield values "100" and "0.2". In this case, since the statistical quantity SK exceeds "0.1", the processing continues to steps S2407 and S2409 in turn. Also, since the skew value SK is a positive value, START=100 and END=102 are set in step S2413.

Subsequently, in the ninth loop of processing (i=8), the average value AV and the statistical quantity SK are calculated using START=100 and END=102 to respectively yield values "101" and "−0.2". In this case, since the statistical quantity SK is less than "−0.1", the processing continues to steps S2407 and S2409 in turn. Also, since the skew value SK is a negative value, START=100 and END=101 are set in step S2414.

Finally, in the 10th loop of processing (i=9), the average value AV and the statistical quantity SK are calculated using START=100 and END=101 to respectively yield values "100" and "0.2". In this case, although the statistical quantity SK exceeds "0.1", since the threshold value determination processing loop count i is "9", the flow advances to step S2416 as a result of discrimination in step S2409, and the average value "100" is set in the threshold value TH, thus ending this threshold value determination processing. However, in the block of this example, since "1" is set in the battered character flag TF, YES is determined in step S2305 in FIG. 25, and the threshold value is limited in step S2306. Hence, TH is set with "85 (=(100×0.85)", and binarization is performed in step S2307 (in this case, TP is set with "0.85"). The binarized image is stored in the storage unit 2005.

The determination processing of the binarization threshold value TH (FIG. 26) in this embodiment will be described below using an example of the histogram shown in FIG. 32.

Figures 32, 33:
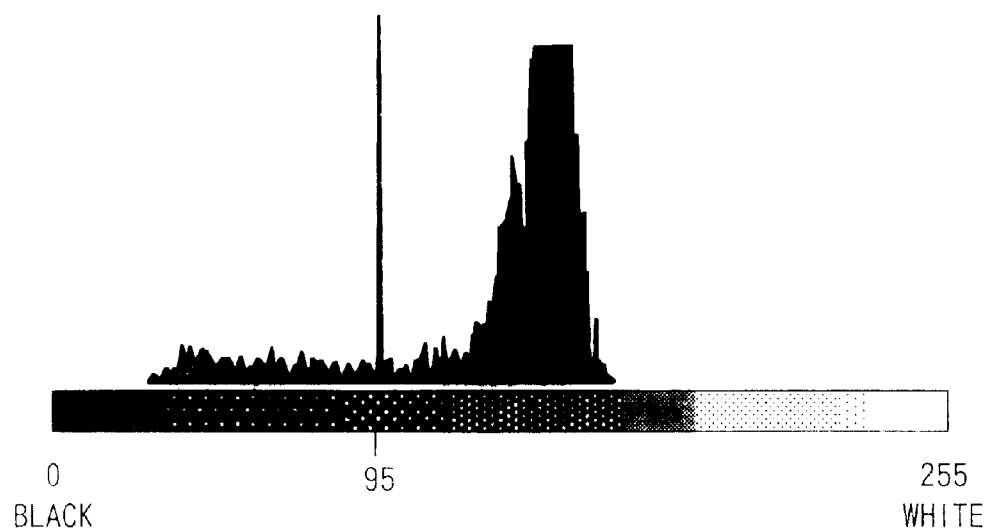
FIG. 32 illustrates an example of the histogram of a blurred character image in the second embodiment.
FIG. 33 is a table showing changes in variables in the binarization processing of a blurred character image in the second embodiment.

FIG. 32 shows the histogram of a blurred character image (8-bit input). FIG. 33 shows changes in parameter values when the processing in steps S2402 and S2403 in the above-mentioned binarization processing shown in FIG. 26 is performed for an image having the histogram shown in FIG. 32. Note that FIG. 33 shows the parameter values in correspondence with the number of loops of steps S2402 and S2403.

In the first loop of processing in steps S2402 and S2403 (the threshold value determination processing loop count i=0), the average value AV and the statistical quantity SK are calculated using START=0 and END=255 to respectively yield values "130" and "−60.2". Since i=0, the flow advances from step S2404 to step S2405. In the image feature discrimination processing in step S2405, relation (20) holds since the statistical quantity SK is less than "−20.0", and "1" is set in the character flag MF. In step S2414, START=0 and END=130 are set.

Subsequently, in the second loop of processing (i=1), the average value AV and the statistical quantity SK are calculated using START=0 and END=130 to respectively yield values "95" and "−19.3". Since the statistical quantity SK exceeds "0.1", the flow advances from step S2406 to step S2407, and since i=1, the flow advances to step S2408. In step S2408, since both the skew values SK and SK0 are negative values, "1" is set in the flag PF. Also, since relation (21) does not hold since "3.11 (=−60.2/−19.3)", the battered character flag TF remains "0". In the blurred character processing in step S2410, since both the character flag MF and the flag PF are "1", relation (22) is calculated in step S2704. In this case, relation (23) holds since the calculation result yields "3.11 (=−60.2/−19.3)", "1" is set in the blurred character flag KF. Since the blurred character flag KF is "1", the flow advances from step S2411 to step S2416, and the average value AV "95" is set in the threshold value TH, thus ending this threshold value determination processing. Thereafter, the input image is binarized in the binarization processing in step S2307 in FIG. 25, and the binarized image is stored in the storage unit 2005.

As described above, in this embodiment, whether the block being processed is a "battered character block" or a "blurred character block" is checked, and the convergence condition for the skew value is set depending on the discriminated type of block, so that the skew value converges to the predetermined condition, thereby determining a binarization threshold value and performing binarization. That is, in an input multivalued image, the feature of the image is discriminated on the basis of its luminance frequencies and the offset of their distribution, so as to specify a region where a threshold value most suitable for separating the background and the object in the image is present. Thereafter, the average luminance value of the specified region is set as a binarization threshold value. In this way, an optimal threshold value for classifying the luminance values of pixels in a certain region on the multi-valued image into two classes, i.e., the background and object, can be automatically obtained.

[Another Embodiment]

In the above embodiment, the input image is an 8-bit gray image. However, the present invention is not limited to such specific image, and a color image may be input. That is, the type of image to be input is not particularly limited as long as information of a plurality of bits is provided as data to be binarized.

Each processing block of an image upon calculating the histogram has a size of 64 pixels×64 pixels. Alternatively, each block may have a size of 32 pixels=32 pixels. Furthermore, each block may have a square or rectangular shape. That is, each processing block may have a size of 64 pixels×96 pixels. Depending on the capacity of a memory, the entire image may be defined as a processing block.

Upon calculating the histogram, sampling of an image may be performed at all the pixel positions or while skipping several pixels. Furthermore, the average value AV and the statistical quantity SK need not be calculated by 8 bits but may be calculated by a smaller number of bits to attain higher-speed processing, small memory capacity, and the like.

The convergence condition of the statistical quantity SK is defined by "+0.1". However, the present invention is not limited to this specific condition, but another condition may be used as long as the binarization threshold values are determined using the statistical quantity SK. Also, the convergence condition may be changed depending on the image input apparatus and image input condition.

Upon discriminating a character block using relation (20), the character flag MF is set to be "−20.0". However, the present invention is not limited to this, and another condition may be defined to discriminate a character block using the statistical quantity SK. Also, the flag value may be changed depending on the image input apparatus and image input condition.

The SR value is used upon discriminating a battered or blurred character block using relation (21) or (22), and is set to be "3.0". However, the present invention is not limited to this, and another condition may be defined to discriminate a battered or blurred character block using the statistical quantity SK. Also, the SR value may be changed depending on the image input apparatus and image input condition.

The maximum threshold value determination processing loop count i is set to be 9 (10 loops). However, needless to say, the present invention is not limited to 10 loops.

The upper- and lower-limit values H and L of each threshold value may be changed depending on the image input apparatus and image input condition.

The constant TP is used for preventing a character from being battered, and is set to be "0.85". However, the present invention is not limited to this, and another condition may be used. For example, the constant may be changed depending on the image input apparatus and image input condition.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to a system or apparatus, and reading out and executing the program code stored in the storage medium by a computer (or a CPU, MPU, or the like) of the system or apparatus.

In this case, the program code itself read out from the storage medium realizes the functions of the above-mentioned embodiments, and the storage medium which stores the program code constitutes the present invention.

As the storage medium for supplying program codes, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing a readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after a program code read out from the storage medium is written in a memory of the extension board or unit.

As described above, according to the above embodiments, upon determining the binarization threshold value used for binarizing a multi-valued image, and performing binarization processing, very high-speed processing can be realized.

In arithmetic operations for image processing of a multi-valued image, predetermined precision can be maintained within the limited range of integer effective numbers that can be processed by a computer, and in particular, high-speed repetitive arithmetic operations can be attained while allowing convergence of large numbers as well as small numbers.

Furthermore, in an input multi-valued image, the feature of the image is discriminated on the basis of the luminance frequencies and the offset of their distribution to specify a region where a threshold value most suitable for separating the background and the object in the image is present, and thereafter, the binarization threshold value is determined based on the average luminance value of the specified region. Accordingly, an optimal threshold value can be automatically set between the object and background densities in the image in correspondence with the character portion in the image and the portion other than the character portion. In this fashion, a binary image in which the object is appropriately separated from the background can be obtained for each of the character portion and the portion other than the character portion.

As many apparently widely different embodiments of the present invention can be made without departing from the spirit and scope thereof, it is to be understood that the invention is not limited to the specific embodiments thereof except as defined in the appended claims.

What is claimed is:

1. An image processing method for determining a binarization threshold value used for binarizing a multi-valued image, and performing binarization processing, comprising the steps of:

inputting multi-valued image data line-seguentially;

determining binarization threshold values sequentially in units of blocks each including a plurality of pixels and having a predetermined size, wherein determining the threshold values includes counting frequencies in units of luminance levels in a block having a predetermined size, and calculating the binarization threshold values on the basis of the luminance frequencies binarizing the multi-values image data line-sequentially; and executing the steps of inputting data, determining the threshold values, and performing binarization by pipeline processing, wherein a memory for counting the luminance frequencies and a memory used in calculating the binarization threshold values are selectively used, and counting processing of the luminance frequencies and arithmetic operation processing of the binarization threshold values are attained by pipeline processing, and wherein the memory for counting the luminance frequencies is constituted by a multi-port RAM to attain counting of the luminance frequencies by pipeline processing, and to avoid breaks and delays of the counting processing generated in the pipeline processing.

2. The method according to claim 1, wherein a buffer used in the steps of inputting data, determining the threshold value, and performing binarization is constituted by a signal memory block, which is time-divisionally accessed for each of the steps.

3. The method according to claim 1, further comprising a step of removing an isolated point from a binary image after the binarization processing.

4. The method according to claim 3, further comprising the step of discriminating a feature of the image on the basis of an offset of the counted luminance frequencies, and removing an isolated point in a region which is determined to be a character region.

5. The method according to claim 1, wherein the step of determining the threshold values includes a step of synchronously executing arithmetic operations of an average value and a skew value based on the luminance frequencies to attain pipeline processing.

6. The method according to claim 1, wherein a size of the block to be processed is changed in correspondence with a resolution of the input multi-valued image data.

7. An image processing method for determining a binarization threshold value used for binarizing a multi-valued image, and performing binarization processing, comprising the steps of:

inputting multi-valued image data line-sequentially;

determining binarization threshold values sequentially in units of blocks each including a plurality of pixels and having a predetermined size;

binarizing the multi-valued image data line-sequentially; and executing the steps of inputting data, determining the threshold values, and performing binarization by pipeline processing, wherein the step of determining the threshold values includes the steps of predicting a value that an operand may assume, on the basis of arithmetic operation formulas of numeric operations and numerical data used in arithmetic operations, determining a decimal point position of the arithmetic operations on the basis of the predicted value, and dropping some digits of the operand or shifting a mantissa of the operand to the left, so that a final operation result falls within a range of a predetermined number of effective digits.

8. The method according to claim 7, wherein the decimal point position of the arithmetic operations is determined for each arithmetic operation.

9. The method according to claim 8, wherein the processing unit is a unit for calculating an average value of the luminance frequencies of the image and an offset of the luminance frequencies of the image.

10. The method according to claim 7, wherein the number of effective digits is determined by a required precision of the operand.

11. An image processing apparatus for determining a binarization threshold value used for binarizing a multi-valued image, and performing binarization processing, comprising:

means for inputting multi-valued image data line-sequentially;

means for determining binarization threshold values sequentially in units of blocks each including a plurality of pixels and having a predetermined size; and means for binarizing the multi-valued image data line-sequentially, wherein said means for inputting data, determining the threshold values, and performing binarization are executed by pipeline processing, and wherein said means for determining the threshold values counts frequencies in units of luminance levels in a block having a predetermined size, and calculates the binarization threshold value on the basis of the luminance frequencies, and wherein the memory for counting the luminance frequencies is constituted by a multi-port RAM to attain counting of the luminance frequencies by pipeline processing, and to avoid breaks and delays of the counting processing generated in the pipeline processing.

12. The apparatus according to claim 11, wherein a buffer used in processing of said means for inputting data, determining the threshold values, and performing binarization is constituted by a single memory block, which is time-divisionally accessed for each processing of said means.

13. The apparatus according to claim 11, wherein a memory for counting the luminance frequencies and a memory used in calculating the binarization threshold values are selectively used, and counting processing of the luminance frequencies and arithmetic operation processing of the binarization threshold values are attained by pipeline processing.

14. The apparatus according to claim 11, further comprising means for removing an isolated point from a binary image after the binarization processing.

15. The apparatus according to claim 14, further comprising means for discriminating a feature of the image on the basis of an offset of the counted luminance frequencies, and removing an isolated point in a region which is determined to be a character region.

16. The apparatus according to claim 11, wherein said means for determining the threshold values synchronously executes arithmetic operations of an average value and a skew value based on the luminance frequencies to attain pipeline processing.

17. The apparatus according to claim 11, wherein a size of the block to be processed is changed in correspondence with a resolution of the input multi-valued image data.

18. An image processing apparatus for determining a binarization threshold value used for binarizing a multi-valued image, and performing binarization processing, comprising:

means for inputting multi-valued image data line-sequentially;

means for determining binarization threshold values sequentially in units of blocks each including a plurality of pixels and having a predetermined size; and means for binarizing the multi-valued image data line-sequentially, wherein said means for inputting data, determining the threshold values, and performing binarization are executed by pipeline processing, and wherein said means for determining the threshold values predicts a value that an operand may assume, on the basis of arithmetic operation formulas of numeric operations and numerical data used in arithmetic operations, determines a decimal point position of the arithmetic operations on the basis of the predicted value, and drops some digits of the operand or shifts a mantissa of the operand to the left, so that a final operation result falls within a range of predetermined number of effective digits.

19. The apparatus according to claim 18, wherein the decimal point position of the arithmetic operations is determined for each arithmetic operation.

20. The apparatus according to claim 19, wherein the processing unit is a unit for calculating an average value of the luminance frequencies of the image and an offset of the luminance frequencies of the image.

21. The apparatus according to claim 18, wherein the number of effective digits is determined by a required precision of the operand.

22. A computer useable medium having computer readable program code means for determining a binarization threshold value used for binarizing a multi-valued image, and performing binarization processing, comprising:

computer readable first program code means for inputting multi-valued image data line-sequentially;

computer readable second program code means for determining binarization threshold values sequentially in units of blocks each including a plurality of pixels and having a predetermined size, wherein determining the threshold values includes counting frequencies in units of luminance levels in a block having a predetermined size, and calculating the binarization threshold values on the basis of the luminance frequencies;

computer readable third program code means for binarizing the multi-valued image data line-sequentially; and computer readable fourth program code means for executing said means for inputting data, determining the threshold value, and performing binarization by pipeline processing, wherein a memory for counting the luminance frequencies and a memory used in calculating the binarization threshold values are selectively used, and counting processing of the luminance frequencies and arithmetic operation processing of the binarization threshold values are attained by pipeline processing; and wherein the memory for counting the luminance frequencies is constituted by a multiport RAM to attain counting of the luminance frequencies by pipeline processing, and to avoid breaks and delays of the counting processing generated in the pipeline processing.

23. A computer useable medium having recorded thereon codes for implementing a computer implementable method of determining a binarization threshold value used for binarizing a multi-valued image, and performing binarization processing, the method comprising the steps of:

inputting multi-valued image data line-sequentially;

determining binarization threshold values sequentially in units of blocks each including a plurality of pixels and having a predetermined size;

binarizing the multi-valued image data line-sequentially; and executing the steps of inputting data, determining the threshold values, and performing binarization by pipeline processing, wherein the step of determining the threshold values includes the steps of predicting a value that an operand may assume, on the basis of arithmetic operation formulas of numeric operations and numerical data used in arithmetic operations, determining a decimal point position of the arithmetic operations on the basis of the predicted value, and dropping some digits of the operand or shifting a mantissa of the operand to the left, so that a final operation result falls within a range of a predetermined number of effective digits.

* * * * *

UNITED STATES PATENT AND TRADEMARK OFFICE
CERTIFICATE OF CORRECTION

PATENT NO.   : 5,956,421
DATED        : September 21, 1999
INVENTOR(S)  : TETSUOMI TANAKA ET AL.

It is certified that error appears in the above-identified patent and that said Letters Patent is hereby corrected as shown below:

COLUMN 5

Line 47, "hold" should read --holds--.

COLUMN 12

Line 29, "$\Sigma(tmpB/2^3))$" should read --$(tmpB/2^3))$--.

COLUMN 13

Line 8, "AV3" (2nd occurrence) should read --AV3b--;
Line 17 "AV3 b" should read --AV3b--.

COLUMN 15

Line 24, "|skn|." should read --|SKn|.--;
Line 38, "sing" should read --sign--.

COLUMN 17

Line 51, "12111" should read --1211--.

COLUMN 21

Line 27, close up right margin;
Line 28, close up left margin and, "[Threshold" should read
   --¶[Threshold--.

COLUMN 26

Line 46, "32 pixels=32 pixels." should read
   --32 pixels X32 pixels.--;

UNITED STATES PATENT AND TRADEMARK OFFICE
CERTIFICATE OF CORRECTION

PATENT NO.   : 5,956,421
DATED        : September 21, 1999
INVENTOR(S)  : TETSUOMI TANAKA ET AL.

It is certified that error appears in the above-identified patent and that said Letters Patent is hereby corrected as shown below:

Line 59, ""+0.1"." should read --"±0.1".--.

COLUMN 28

Line 24, "line-seguentially;" should read --line-sequentially;--.

Signed and Sealed this

Thirtieth Day of January, 2001

Attest:

Q. TODD DICKINSON

*Attesting Officer*       *Director of Patents and Trademarks*